US012656705B2

(12) United States Patent
Uemura

(10) Patent No.: US 12,656,705 B2
(45) Date of Patent: Jun. 16, 2026

(54) IMAGE FORMING APPARATUS

(71) Applicant: CANON KABUSHIKI KAISHA, Tokyo (JP)

(72) Inventor: Naoki Uemura, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/741,162

(22) Filed: Jun. 12, 2024

(65) Prior Publication Data

US 2024/0419096 A1 Dec. 19, 2024

(30) Foreign Application Priority Data

Jun. 14, 2023 (JP) ................................ 2023-097770

(51) Int. Cl.
*G03G 15/04* (2006.01)
*G03G 15/00* (2006.01)

(52) U.S. Cl.
CPC ....... *G03G 15/04036* (2013.01); *G03G 15/80* (2013.01)

(58) Field of Classification Search
USPC ............................................................ 399/88
See application file for complete search history.

(56) References Cited

U.S. PATENT DOCUMENTS 8,345,074 B2 1/2013 Okazaki
2010/0225728 A1* 9/2010 Okazaki ..................... B41J 2/45 315/228
2021/0341865 A1* 11/2021 Sato .................. G03G 15/5041

FOREIGN PATENT DOCUMENTS

JP 2000156548 A * 6/2000
JP 2012238724 A * 12/2012 ........... H05K 1/0231
JP 2013154506 A * 8/2013

OTHER PUBLICATIONS

Translation of JP2000-156548A, published Jun. 6, 2000 to Yamazaki (Year: 2000).*
Translation of JP2012-238724A, published Dec. 2012, to Adachi (Year: 2012).*
Translation of JP2013-154506A, published Aug. 2013, to Horiguchi (Year: 2013).*

* cited by examiner

*Primary Examiner* — Quana Grainger
(74) *Attorney, Agent, or Firm* — Canon U.S.A., Inc. IP Division

(57) ABSTRACT

An exposure head includes at least one light-emitting chip and a board. The at least one light-emitting chip includes a plurality of light-emitting portions for emitting light for exposing a photosensitive member from light-emitting surfaces. The at least one light-emitting chip is supplied with power from a power source via a power line. The board is on one surface of which at least one bypass capacitor connected to the power line and a ground and the at least one light-emitting chip are mounted. In a vertical direction perpendicular to the one surface of the board, a first height as a height from the one surface of the board to the light-emitting surfaces is higher than a second height as a height from the one surface of the board to an end of the at least one bypass capacitor farthest from the one surface of the board.

14 Claims, 19 Drawing Sheets

IMAGE FORMING APPARATUS

BACKGROUND

Field

The present disclosure relates to electrophotographic image forming apparatuses using an exposure head, and the exposure head used for electrophotographic image forming apparatuses.

Description of the Related Art

Electrophotographic printers are generally known to expose a photosensitive drum by using an exposure head using light-emitting diodes (LEDs) or organic electroluminescence (EL) devices to form a latent image on the surface of the photosensitive drum. U.S. Pat. No. 8,345,074 discloses an optical print head including a plurality of light-emitting chips provided with light-emitting points on the front surface of a long board. In the manufacturing process of an exposure head discussed in U.S. Pat. No. 8,345,074, foreign matter may fall on the light-emitting surface of a light-emitting chip. The fallen foreign matter needs removing by bringing a cleaning member into contact with the light-emitting surface. However, if electronic components are disposed in addition to the light-emitting chips on the front surface of the board, foreign matter on the light-emitting surface of a light-emitting chip may not be sufficiently removed.

SUMMARY

The present disclosure is directed to providing an exposure head including light-emitting chips and electronic components mounted on a surface of a board, allowing effective removal of foreign matter on the light-emitting surfaces of light-emitting chips, and to providing an image forming apparatus including the exposure head.

According to an aspect of the present disclosure, an exposure head includes at least one light-emitting chip including a plurality of light-emitting portions for emitting light for exposing a photosensitive member from light-emitting surfaces, wherein the at least one light-emitting chip is configured to be supplied with power from a power source via a power line, and a board on one surface of which at least one bypass capacitor connected to the power line and a ground and the at least one light-emitting chip are mounted, wherein, in a vertical direction perpendicular to the one surface of the board, a first height as a height from the one surface of the board to the light-emitting surfaces is higher than a second height as a height from the one surface of the board to an end of the at least one bypass capacitor farthest from the one surface of the board.

Further features of the present disclosure will become apparent from the following description of exemplary embodiments with reference to the attached drawings.

DESCRIPTION OF THE EMBODIMENTS

Exemplary embodiments of the present disclosure will be described below with reference to the accompanying drawings. The following exemplary embodiments do not limit the present disclosure within the scope of the appended claims. While a plurality of features is described in the exemplary embodiments, not all of the plurality of features is used in the present disclosure, and any combination of the plurality of features can be used. In the accompanying drawings, like numbers refer to the same or similar components, and redundant descriptions thereof will be omitted.

<Configuration of Image Forming Apparatus>

Figure 1:
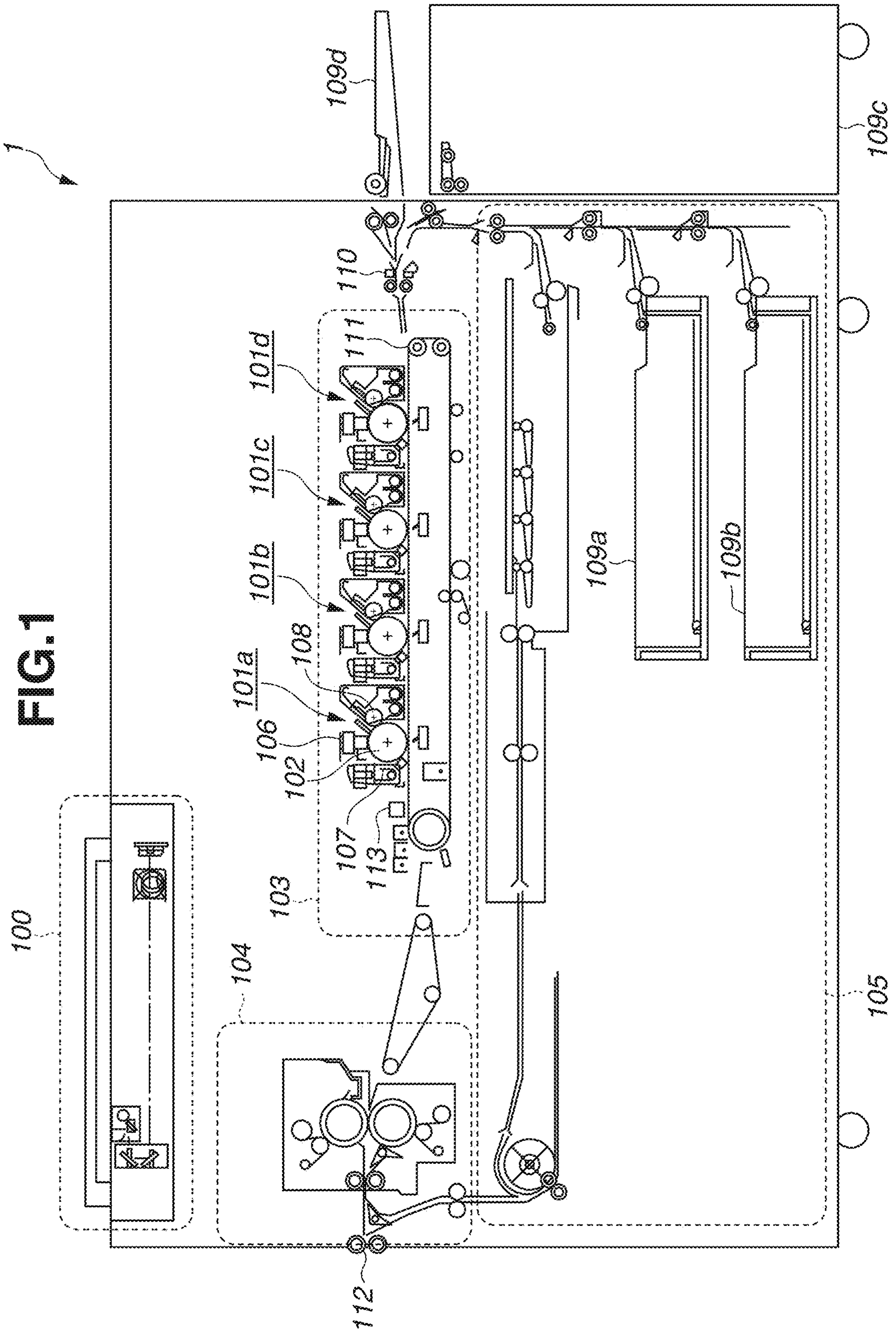
FIG. 1 schematically illustrates a configuration of an image forming apparatus according to an exemplary embodiment.

FIG. 1 schematically illustrates an example of a configuration of an image forming apparatus 1 according to an exemplary embodiment. The image forming apparatus 1 includes a reading unit 100, an image forming unit 103, a fixing unit 104, and a conveyance unit 105. The reading unit 100 optically reads a document placed on a platen to generate read image data. The image forming unit 103 forms, for example, an image on a sheet based on the read image data generated by the reading unit 100 or printing image data received from an external device via a network.

The image forming unit 103 includes image forming units 101*a*, 101*b*, 101*c*, and 101*d* for forming black, yellow, magenta, and cyan toner images, respectively. The image forming units 101*a*, 101*b*, 101*c*, and 101*d* have similar configurations and hereinafter these units are collectively referred to as an image forming unit 101. A photosensitive drum 102 of the image forming unit 101 is rotatably driven in the clockwise direction in FIG. 1 during image formation. A charging device 107 charges the photosensitive drum 102. An exposure head 106 exposes the photosensitive drum 102 to form an electrostatic latent image on the surface of the photosensitive drum 102. A developing device 108 develops the electrostatic latent image on the photosensitive drum 102 with toner to form a toner image. The toner image formed on the surface of the photosensitive drum 102 is transferred to a sheet conveyed on a transfer belt 111. Transferring respective color toner images on the four different photosensitive drums 102 to a sheet allows the formation of a color image consisting of four different color components (black, yellow, magenta, and cyan).

The conveyance unit 105 controls sheet feeding and conveyance. More specifically, the conveyance unit 105 feeds a sheet from a unit specified from an internal storage units 109*a* and 109*b*, an external storage unit 109*c*, and a manual feed unit 109*d* to a conveyance path of the image forming apparatus 1. The fed sheet is conveyed to a registration roller 110 that conveys the sheet to the transfer belt 111 at an appropriate timing so that the toner images on the respective photosensitive drums 102 are transferred to the sheet. As described above, the toner images are transferred to the sheet while the sheet is being conveyed on the transfer belt 111. The fixing unit 104 heats and pressurizes the sheet with the toner images transferred thereon to fix the toner images to the sheet. After the toner images are fixed, the sheet is discharged out of the image forming apparatus 1 by a discharge roller 112. An optical sensor 113 is disposed at the opposed position of the transfer belt 111.

The optical sensor 113 optically reads a test chart formed on the transfer belt 111 by the image forming unit 101. If a positional deviation is detected in the test chart read by the optical sensor 113, an image controller 700 (described below) performs control to compensate for the positional deviation during execution of the subsequent job.

While, in the above-described example, the toner images are directly transferred from the respective photosensitive drums 102 to the sheet on the transfer belt 111, the toner images can be indirectly transferred to the sheet from the photosensitive drums 102 via an intermediate transfer member. While, in the above-described example, a color image is formed using toners of multiple colors, the technique according to the present disclosure is also applicable to image forming apparatuses for forming a monochrome image by using a toner of a single color.

<Configuration Example of Exposure Head>

Figure 2A:
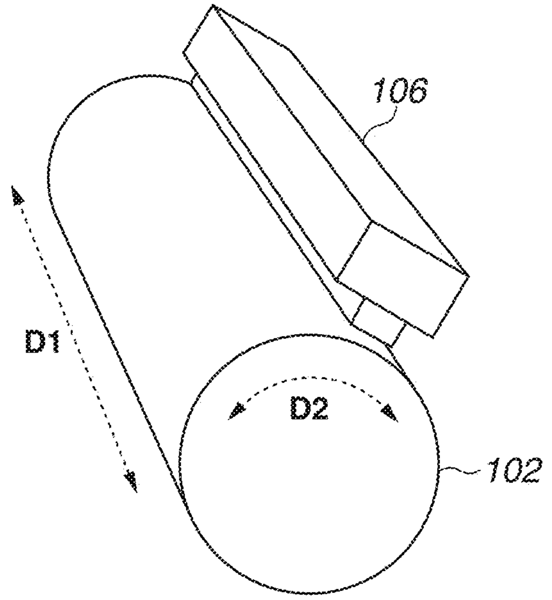
FIGS. 2A and 2B illustrate configurations of a photosensitive drum and an exposure head, respectively, according to an exemplary embodiment.
Figure 2B:
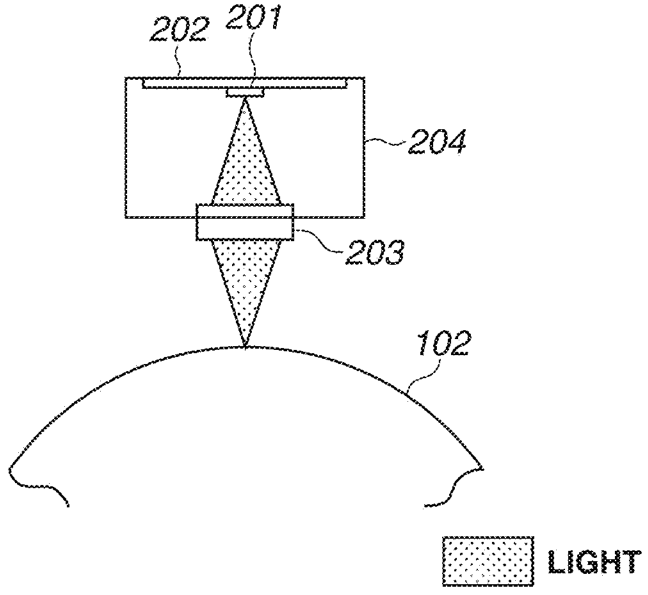

FIGS. 2A and 2B illustrate the photosensitive drum 102 and the exposure head 106. The exposure head 106 includes a light-emitting element array 201 including a plurality of light-emitting elements 602, a printed circuit board 202 including the light-emitting element array 201, a rod lens array 203, and a housing 204 for holding the rod lens array 203 and the printed circuit board 202. The photosensitive drum 102 has a cylindrical shape. The exposure head 106 is disposed such that its longitudinal direction is parallel to an axial direction D1 of the photosensitive drum 102, and the surface on which the rod lens array 203 is mounted faces the surface of the photosensitive drum 102. While the photosensitive drum 102 is rotating in a circumferential direction D2, the light-emitting elements 602 of the exposure head 106 emit light from the light-emitting surfaces, and the rod lens array 203 condenses the light on the surface of the photosensitive drum 102. This means that the light-emitting elements 602 correspond to a light-emitting portion.

Figure 3A:
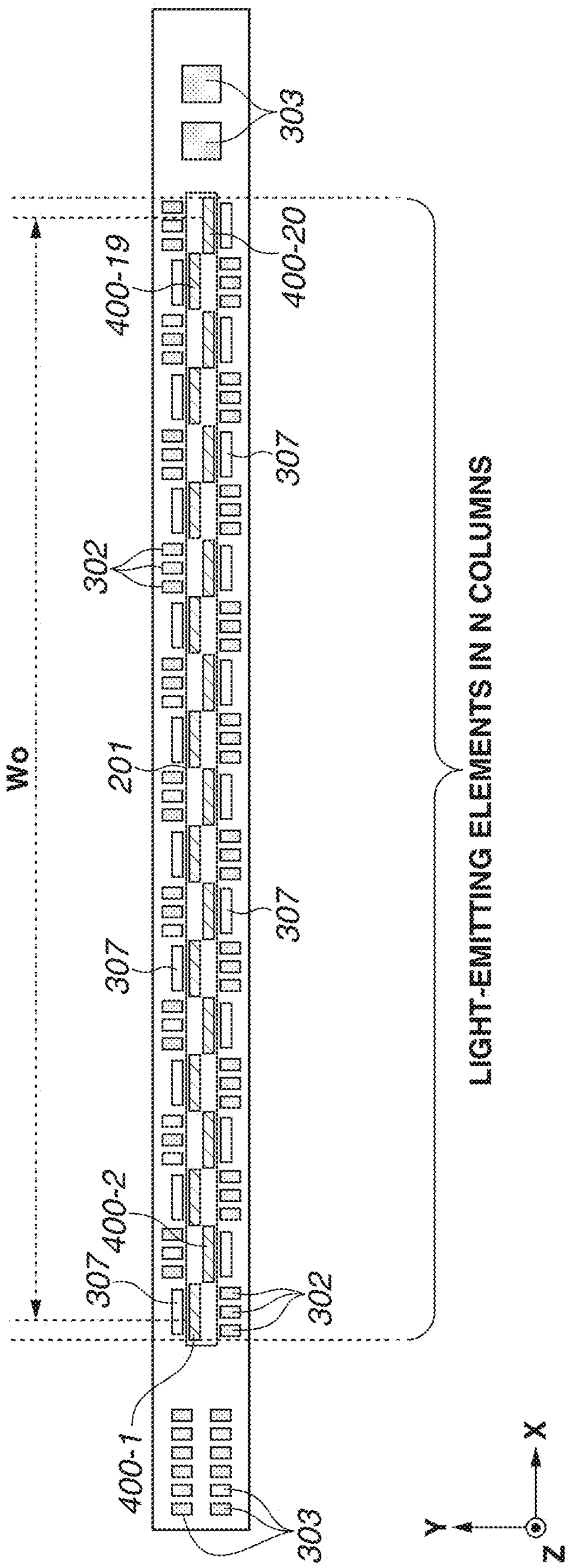
FIGS. 3A and 3B illustrate a configuration of a printed circuit board of the exposure head according to an exemplary embodiment.
Figure 3B:
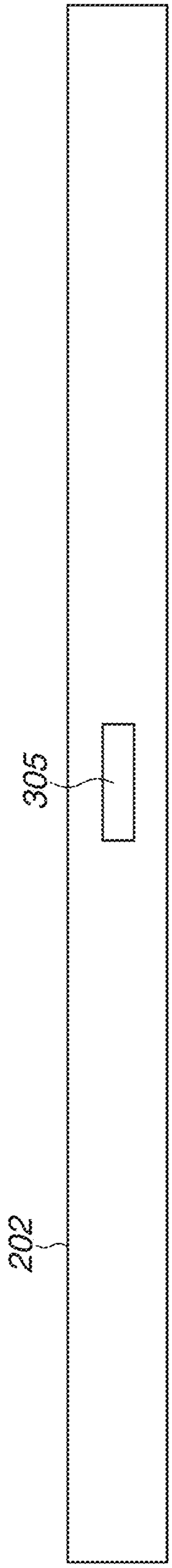

A configuration of the printed circuit board 202 will be described below. FIGS. 3A and 3B illustrate an example of a configuration of the printed circuit board 202. FIG. 3A illustrates the surface on which the light-emitting element array 201 is mounted. FIG. 3B illustrates the surface on which a connector 305 (the surface on the opposite side of the surface on which the light-emitting element array 201 is mounted) is mounted. In the following description, in some cases, the longitudinal direction (X direction) of the printed circuit board 202 is referred to as the "longitudinal direction", the lateral direction (Y direction) of the printed circuit board 202 the "lateral direction", and the height or thickness direction (Z direction) of the printed circuit board 202 the "height direction" or "vertical direction" for convenience of description.

According to the present exemplary embodiment, the light-emitting element array 201 includes a plurality of two-dimensionally arranged light-emitting elements. The light-emitting element array 201 includes the light-emitting elements with N columns in the axial direction D1 and M rows in the circumferential direction D2 of the photosensitive drum 102, where M and N are integers greater than or equal to 2. Referring to the example in FIG. 3A, the light-emitting element array 201 includes 20 light-emitting chips 400-1 to 400-20 each including a subset of the plurality of light-emitting elements. The light-emitting chips 400-1 to 400-20 are arranged in a zigzag pattern in the axial direction D1. The light-emitting chips 400-1 to 400-20 are collectively referred to as light-emitting chips 400. As illustrated in FIG. 3A, the range occupied by all of the light-emitting elements of the 20 light-emitting chips in the axial direction D1 is larger than the range occupied by a maximum width W0 of input image data. None of the light-emitting elements positioned at both ends in the axial direction D1 thus can be used to expose the photosensitive drum 102 if no image positional deviation is detected. Each of the light-emitting chips 400 on the printed circuit board 202 is connected to the image controller 700 (FIG. 7) via the connector 305. In the following description, of the light-emitting chips 400-1 to 400-20 arranged in the axial direction D1, light-emitting chips with smaller sub numbers may be referred to as "left", and light-emitting chips with greater sub numbers "right" for convenience of description. For example, the light-emitting chip 400-1 is the leftmost light-emitting chip 400, and the light-emitting chip 400-20 is the rightmost light-emitting chip 400. A printed circuit board electrode group 307 is a collection of electrodes used for electrical connection to the light-emitting chips 400. Printed circuit board electrode groups 307-1 to 307-20 are each electrically connected to the corresponding light-emitting chip of the light-emitting chips 400-1 to 400-20, respectively. More specifically, the printed circuit board electrode group 307-1 is connected to the light-emitting chip 400-1, the printed circuit board electrode 307-2 is connected to the light-emitting chip 400-2, and so on.

Figure 4:
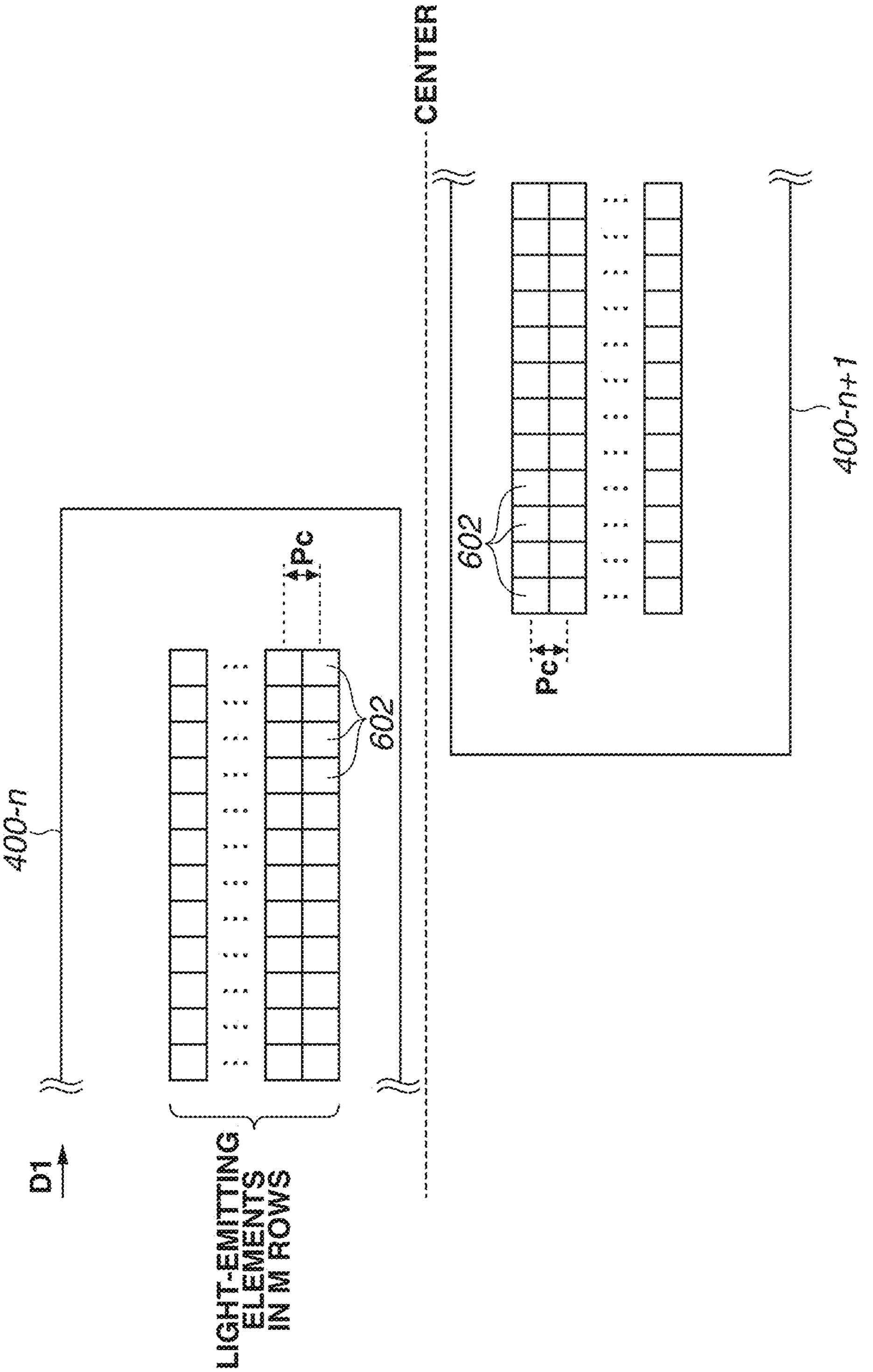
FIG. 4 illustrates light-emitting chips and light-emitting element arrays in the light-emitting chips according to an exemplary embodiment.

FIG. 4 schematically illustrates the light-emitting chips 400 and the light-emitting elements 602 in an array in the light-emitting chips 400. The number of light-emitting elements 602, J (J=N/20), arranged in each row of one light-emitting chip 400 may be equal to, for example, 748

(J=748). On the other hand, the number of light-emitting elements 602 arranged in each column of one light-emitting chip 400 may be equal to, for example, 4 (M=4). More specifically, according to an exemplary embodiment, each light-emitting chip 400 includes 748 light-emitting elements 602 in the axial direction D1 and 4 light-emitting elements 602 in the circumferential direction D2, i.e., a total of 2,992 (=748×4) light-emitting elements 602.

An interval Pc between the central points of adjacent light-emitting elements 602 in the circumferential direction D2 may be, for example, about 21.16 μm corresponding to a resolution of 1,200 dots per inch (dpi). The interval between the central points of adjacent light-emitting elements 602 in the axial direction D1 may also be about 21.16 μm. In this case, the 748 light-emitting elements 602 occupy a length of about 15.8 mm in the axial direction D1. Although, in the example in FIG. 4, the light-emitting elements 602 are arranged in a complete lattice pattern for convenience of description, M light-emitting elements 602 (M=4) in each column are actually arranged in a step pattern.

Figure 5:
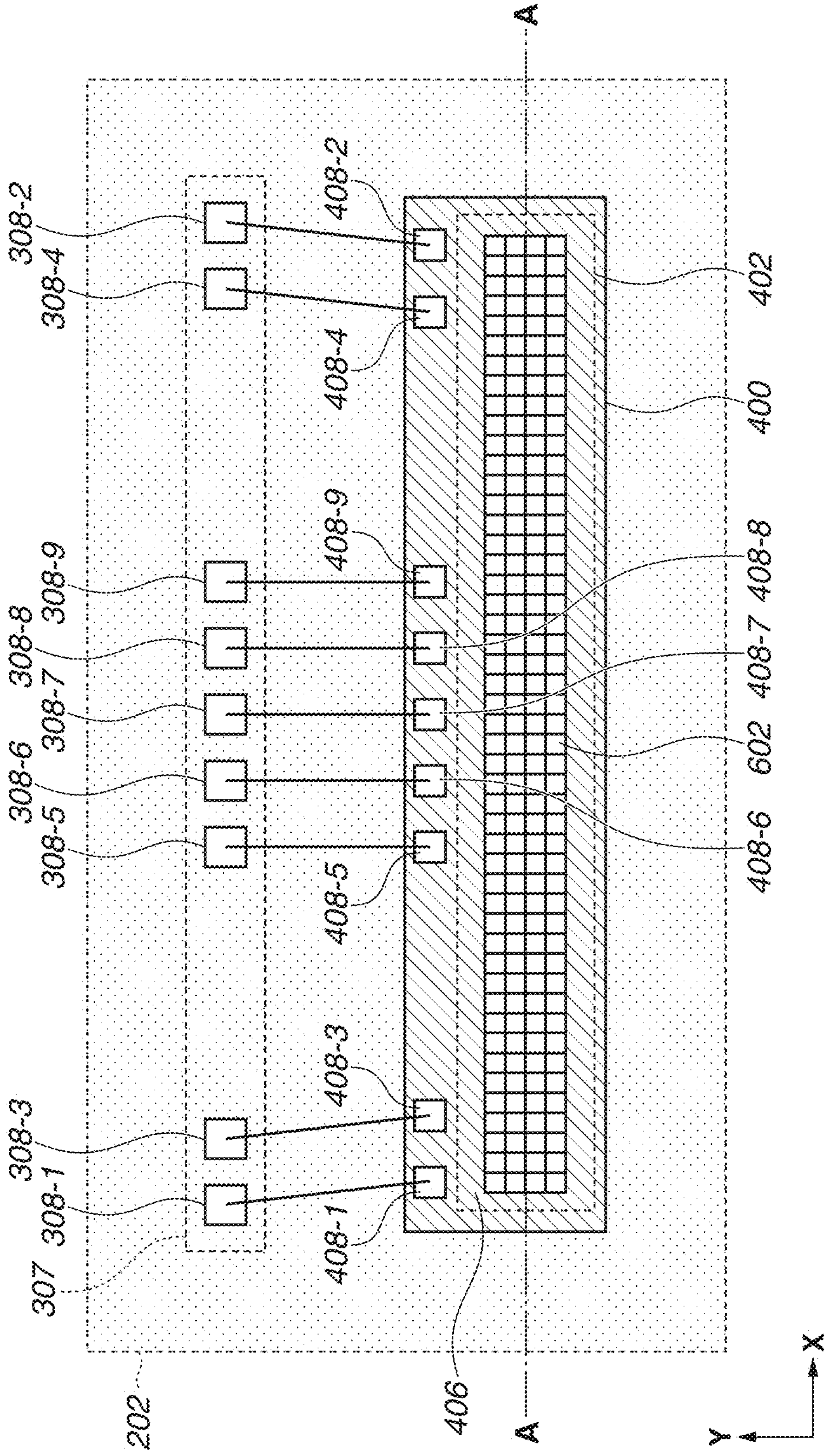
FIG. 5 is a plan view schematically illustrating partial configurations of each light-emitting chip and a printed circuit board according to an exemplary embodiment.

FIG. 5 is a plan view schematically illustrating partial configurations of the light-emitting chips 400 and the printed circuit board 202. For example, the plurality of the light-emitting elements 602 in each light-emitting chip 400 is formed on a light-emitting substrate 402 as a silicon substrate. The light-emitting substrate 402 is provided with a circuit unit 406 for driving the plurality of the light-emitting elements 602. The light-emitting substrate electrodes 408-1 to 408-9 are electrodes for connecting signal lines for communicating with the image controller 700 (see FIG. 7), a power line for connecting to a power source, and a ground line for connecting to a ground as the ground potential from the printed circuit board 202.

The light-emitting substrate electrodes 408-1 to 408-9 are collectively referred to as light-emitting substrate electrodes 408. A printed circuit board electrode group 307 of the printed circuit board 202 includes printed circuit board electrodes 308-1 to 308-9. The printed substrate electrodes 308-1 to 308-9 are electrodes for connecting signal lines for communicating with the image controller 700, a power line for connecting to a power source, and a ground line for connecting to a ground, to the light-emitting substrate electrodes 408-1 to 408-9. The printed circuit board electrodes 308-1 to 308-9 are collectively referred to as printed circuit board electrodes 308. The printed circuit board electrodes 308-1 to 308-9 are each electrically connected to the corresponding light-emitting substrate electrode of the light-emitting substrate electrodes 408-1 to 408-9, respectively. More specifically, the printed circuit board electrode 308-1 is connected to the light-emitting substrate electrode 408-1, the printed circuit board electrode 308-2 is connected to the light-emitting substrate electrode 408-2, and so on. For example, gold wires are usable for electrical connections.

Figure 6:
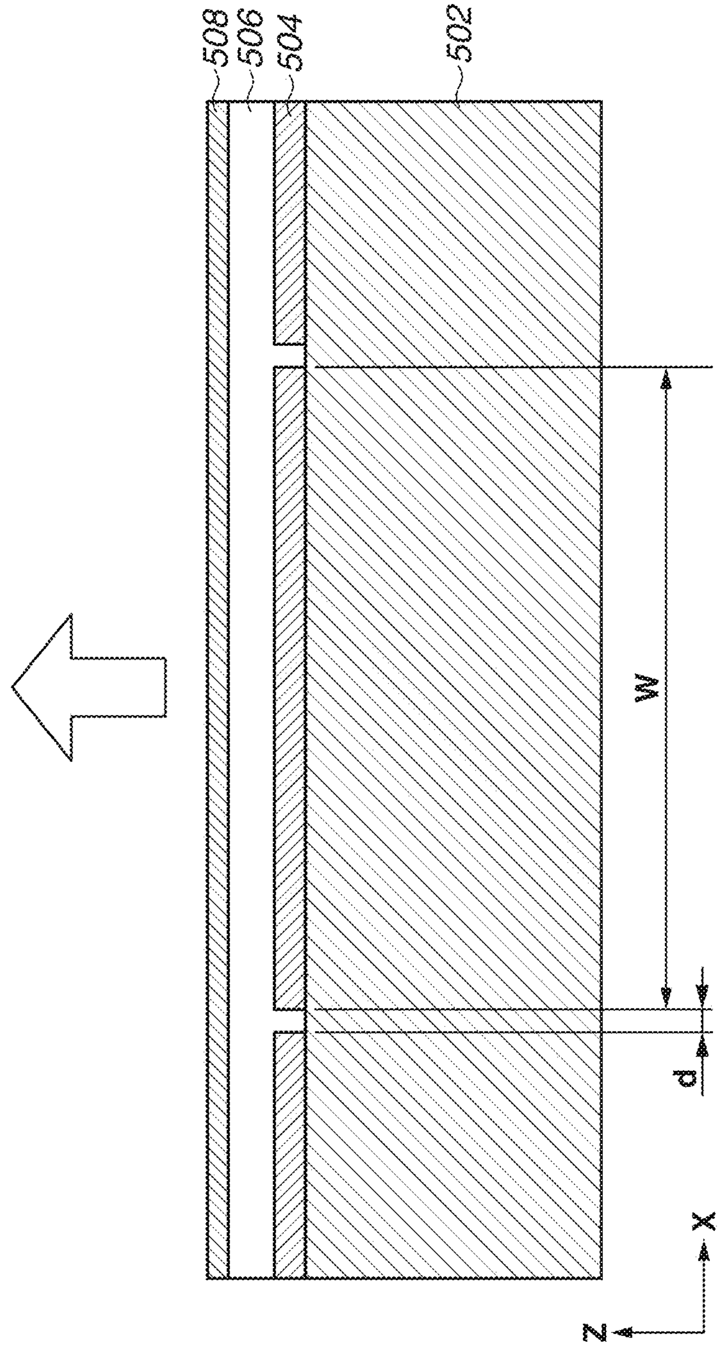
FIG. 6 is a cross-sectional view schematically illustrating a configuration of each light-emitting chip according to an exemplary embodiment.

FIG. 6 is a partial cross-sectional view taken along the line A-A of FIG. 5. A plurality of the lower electrodes 504 is formed on the light-emitting substrate 402. A gap with a length d is provided between two adjacent lower electrodes 504. A light-emitting layer 506 is disposed on the lower electrodes 504, and an upper electrode 508 is provided on the light-emitting layer 506. The upper electrode 508 is one common electrode for the plurality of the lower electrodes 504. When a voltage is applied between a lower electrode 504 and the upper electrode 508, a current flows from the lower electrode 504 to the upper electrode 508, causing the light-emitting layer 506 to emit light. One lower electrode 504 and partial regions of the light-emitting layer 506 and the upper electrode 508 corresponding to the corresponding lower electrode 504 constitute one light-emitting element 602. In other words, according to the present exemplary embodiment, the light-emitting substrate 402 includes the plurality of the light-emitting elements 602.

For example, an organic electroluminescence (EL) film can be used as the light-emitting layer 506. For example, the upper electrode 508 is formed of a transparent electrode made of indium tin oxide (ITO) to transmit the emission wavelength of the light-emitting layer 506. While, according to the present exemplary embodiment, the entire upper electrode 508 transmits the emission wavelength of the light-emitting layer 506, the entire upper electrode 508 does not necessarily need to transmit the emission wavelength. More specifically, it is sufficient that a partial region through which the light from each light-emitting element 602 passes transmit the emission wavelength. While one continuous light-emitting layer 506 is formed in FIG. 6, a plurality of the light-emitting layers 506 having the same width as the width W of each of the lower electrodes 504 may be formed on the lower electrodes 504. While the upper electrode 508 is one common electrode for the plurality of the lower electrodes 504, a plurality of the upper electrodes 508 having the same width as the width W of each of the lower electrodes 504 may be each formed for the corresponding lower electrodes of the plurality of the lower electrodes 504. Of the lower electrodes 504 in each light-emitting chip 400, a first plurality of the lower electrodes 504 may be covered with a first light-emitting layer 506, and a second plurality of the lower electrodes 504 may be covered with a second light-emitting layer 506. Of the lower electrodes 504 in each light-emitting chip 400, a first upper electrode 508 may be formed commonly for the first plurality of the lower electrodes 504, and a second upper electrode 508 may be formed commonly for the second plurality of the lower electrodes 504. In these configurations, one lower electrode 504 and the regions of the light-emitting layer 506 and the upper electrode 508 corresponding to the corresponding lower electrode 504 constitute one light-emitting element 602. With the light-emitting portion according to the present exemplary embodiment, as described above, the light-emitting layer 506 may be formed commonly for all of the lower electrodes 504, the light-emitting layer 506 may be formed independently of each of the lower electrodes 504, or the light-emitting layer 506 may be formed commonly for a plurality of the lower electrodes 504.

Figure 7:
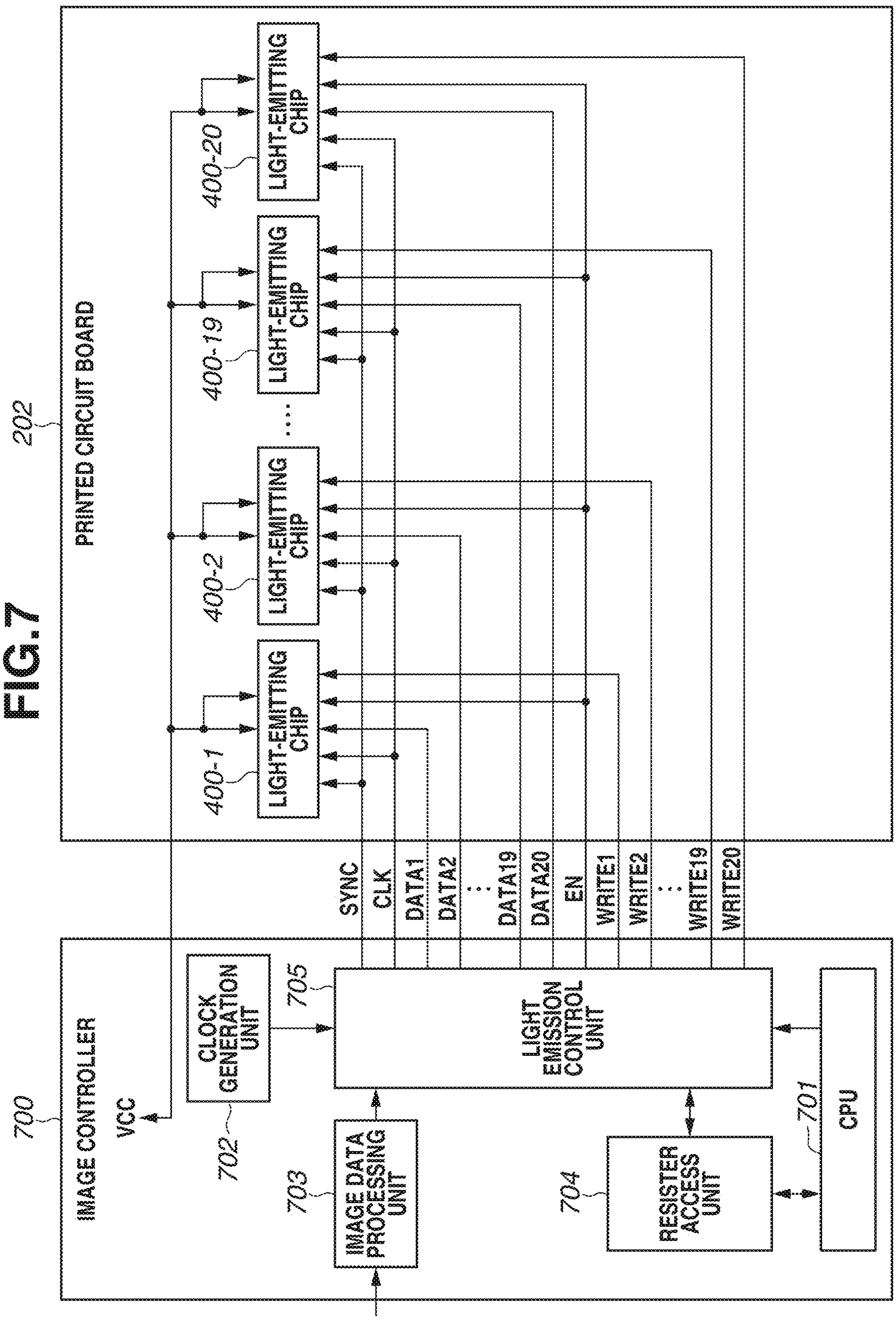
FIG. 7 is a circuit diagram illustrating a control configuration of an exposure apparatus according to an exemplary embodiment.

FIG. 7 is a circuit diagram related to a control configuration for controlling the light-emitting chips 400. The image controller 700 is a control circuit for communicating with the printed circuit board 202 via a plurality of signal lines (wires). The image controller 700 includes a central processing unit (CPU) 701, a clock generation unit 702, an image data processing unit 703, a register access unit 704, and a light emission control unit 705. The light emission control unit 705 is a component included in the exposure apparatus, together with the exposure head 106. The light emission control unit 705 terminates signal lines between the light emission control unit 705 and the printed circuit board 202. An N-th light-emitting chip 400-*n* (n is an integer from 1 to 20) on the printed circuit board 202 is connected to the light emission control unit 705 via signal lines DATAn and WRITEn. The signal line DATAn is used for the image controller 700 to transmit image data to the light-emitting chip 400-*n*. The signal line WRITEn is used for the image controller 700 to write control data to the register of the light-emitting chip 400-*n*.

Further, a signal line CLK, a signal line SYNC, and a signal line EN are provided between the light emission control unit 705 and each light-emitting chip 400. The signal line CLK is used to transmit a clock signal for data transmission on the signal lines DATAn and WRITEn. The light emission control unit 705 outputs a clock signal generated based on a reference clock signal from the clock generation unit 702, to the signal line CLK. Signals transmitted to the signal lines SYNC and EN will be described below.

The CPU 701 generally controls the image forming apparatus 1. The image data processing unit 703 performs image processing on image data received from the reading unit 100 or an external device to generate image data in a binary bitmap format for ON/OFF control of the light emitted by the light-emitting elements 602 of the light-emitting chips 400 on the printed circuit board 202. Examples of the image processing include raster conversion, gradation correction, color conversion, and half-tone processing. The image data processing unit 703 transmits the generated image data to the light emission control unit 705 as input image data. The resister access unit 704 receives control data to be written to the register in each light-emitting chip 400 from the CPU 701 and then transmits the data to the light emission control unit 705.

Figure 8:
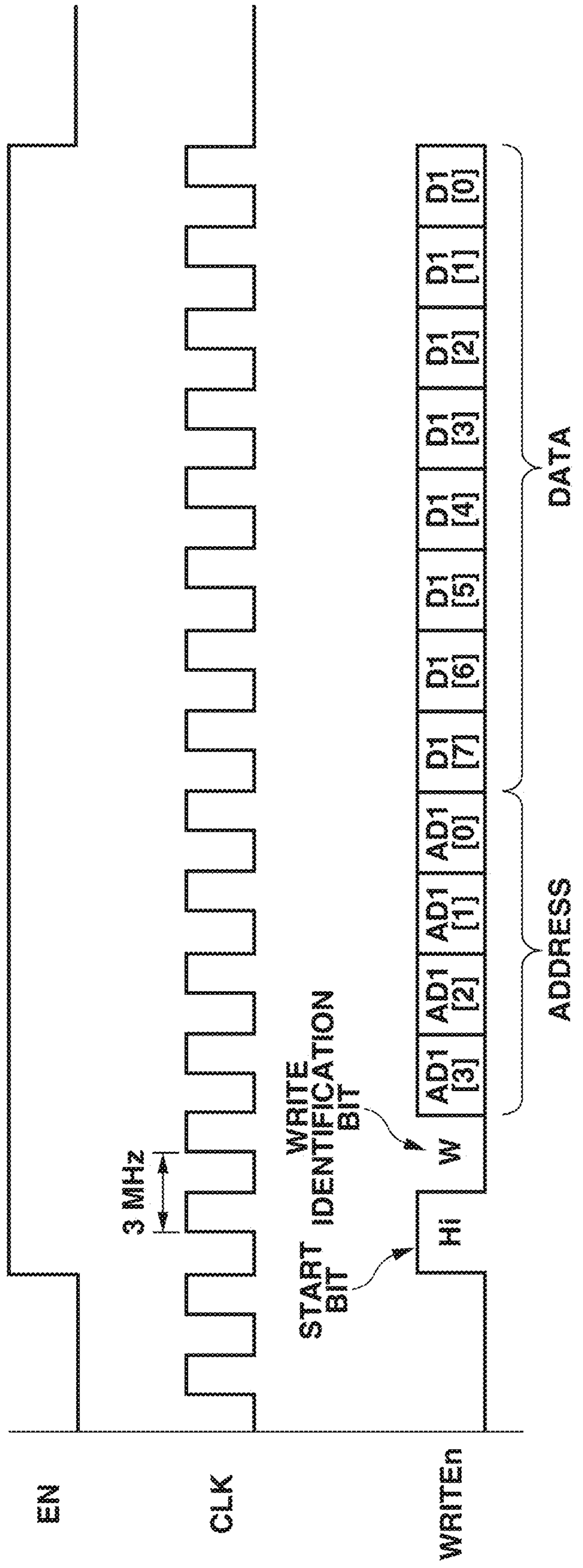
FIG. 8 is a signal chart related to accessing a resister of each light-emitting chip according to an exemplary embodiment.

FIG. 8 illustrates transitions in signal levels of respective signal lines in writing control data to the register of each light-emitting chip 400. During communication, a high-level enable signal indicating that communication is in progress is output to the signal line EN. The light emission control unit 705 transmits a start bit to the signal line WRITEn in synchronization with the rising edge of the enable signal. Subsequently, the light emission control unit 705 transmits a write identification bit indicating a write operation, and then transmits the address of the register (4 bits according to the present exemplary embodiment) to which to write control data and the control data (8 bits according to the present exemplary embodiment). In writing control data to the register, for example, the light emission control unit 705 sets the frequency of the clock signal to be transmitted to the signal line CLK to 3 megahertz (MHz).

Figure 9:
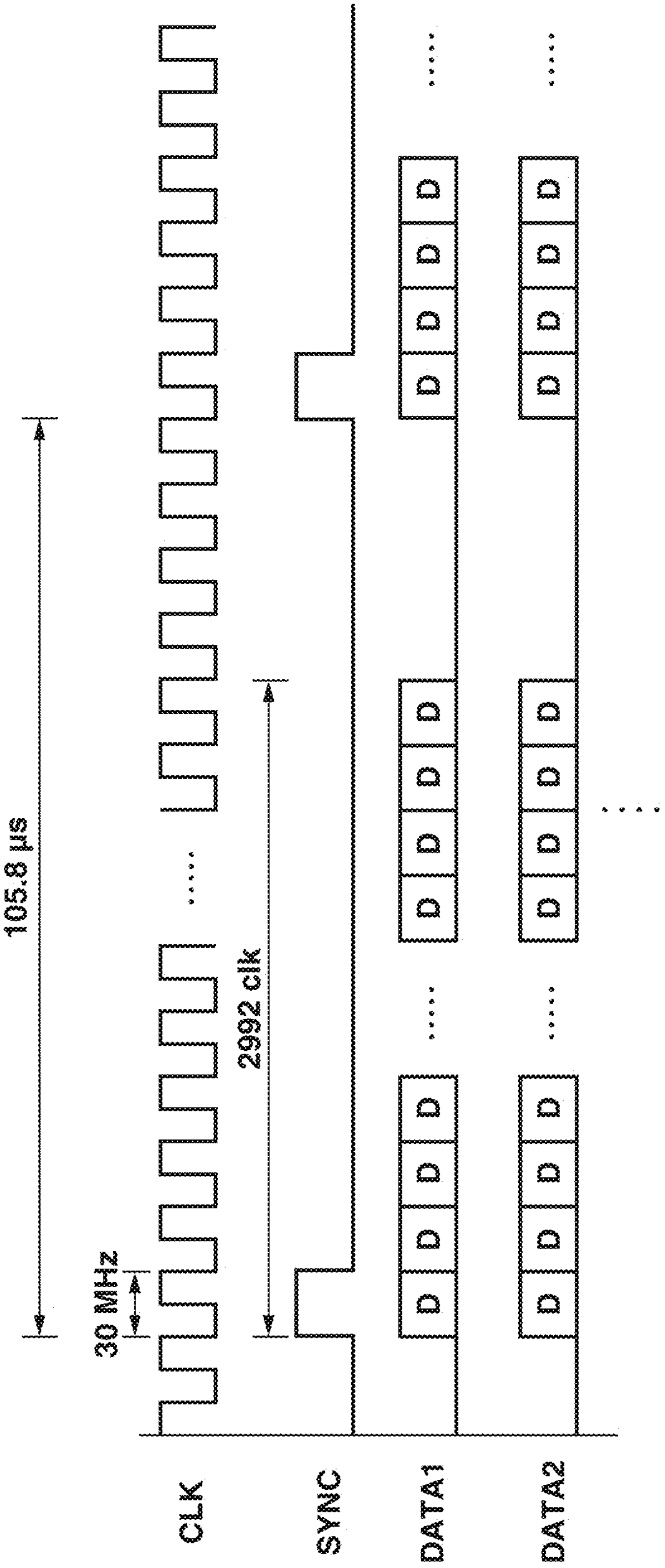
FIG. 9 is signal chart related to image data transmission to each light-emitting chip according to an exemplary embodiment.

FIG. 9 illustrates transitions of signal levels of respective signal lines in transmitting image data to the light-emitting chip 400. A periodical line synchronization signal indicating the exposure timing of each line to the photosensitive drum 102 is output to the signal line SYNC. With a circumferential speed of the photosensitive drum 102 of 200 mm/s and a circumferential resolution of 1,200 dpi (about 21.16 μm), the line synchronization signal is output at intervals of about 105.8 μs. The light emission control unit 705 transmits image data to signal lines DATA1 to DATA20 in synchronization with the rising edge of the line synchronization signal. According to the present exemplary embodiment, since each light-emitting chip 400 includes 2,992 light-emitting elements 602, the light emission control unit 705 transmits image data indicating energization/de-energization of each of the 2,992 light-emitting elements 602 to each light-emitting chip 400 within an interval of about 105.8 μs. According to the present exemplary embodiment, the light emission control unit 705 sets the frequency of the clock signal to be transmitted to the signal line CLK to 30 MHz in transmitting image data, as illustrated in FIG. 9.

Figure 10:
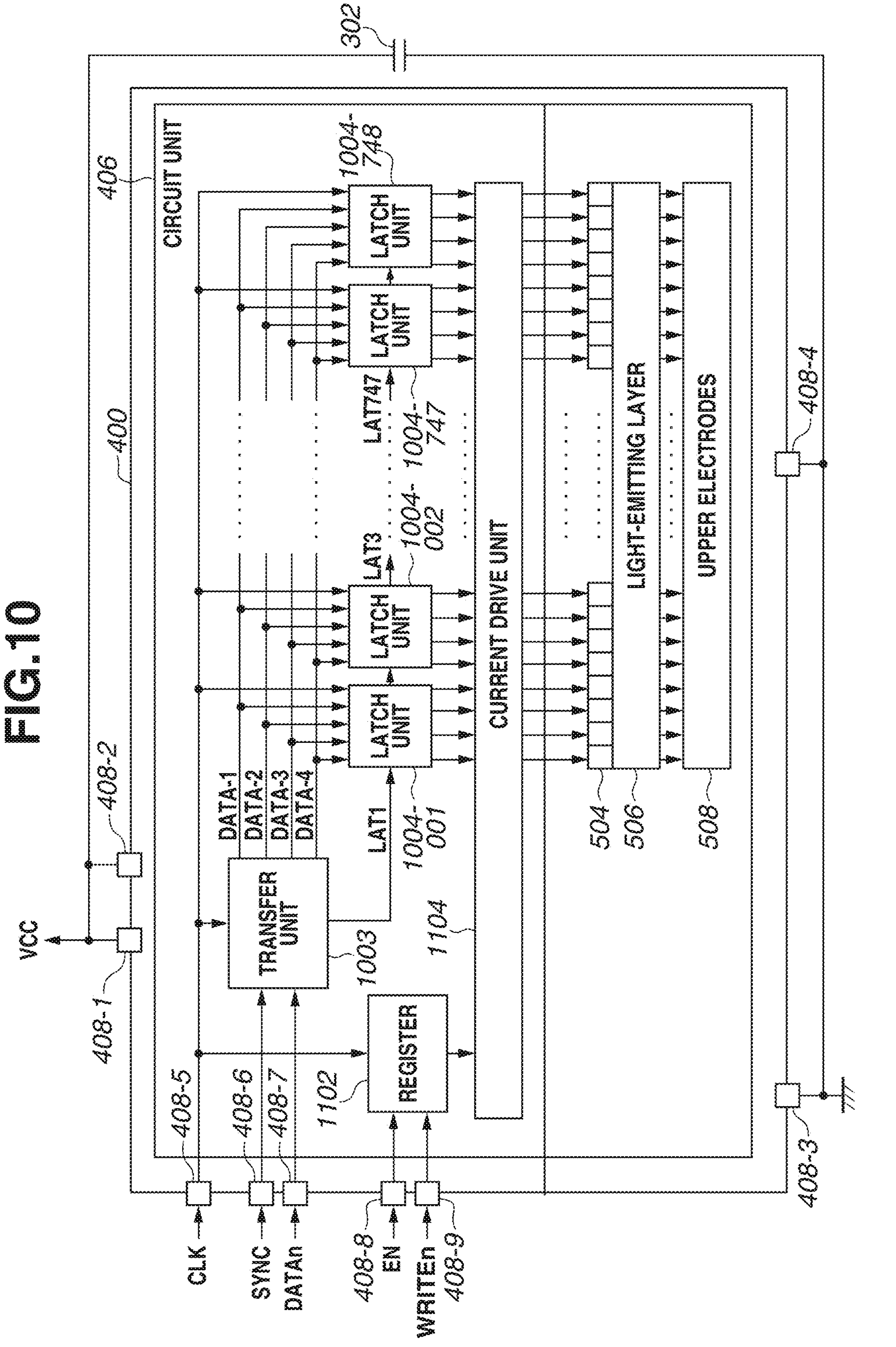
FIG. 10 is a functional block diagram illustrating a detailed configuration of each light-emitting chip according to an exemplary embodiment.

FIG. 10 is a functional block diagram illustrating a detailed configuration of one light-emitting chip 400 (the n-th light-emitting chip 400-*n*). As illustrated in FIG. 5, each light-emitting chip 400 includes nine pads 408-1 to 408-9. The pads 408-1 and 408-2 are connected to a power voltage VCC via a power line. Power of this power voltage VCC is supplied to each circuit in the circuit unit 406 of the light-emitting chip 400. The pads 408-3 and 408-4 are connected to a ground via a ground line. Each circuit and the upper electrodes 508 in the circuit unit 406 are connected to a ground via the pads 408-3 and 408-4. The signal line CLK is connected to a transfer unit 1003, a register 1102, and latch units 1004-001 to 1004-748 via the pad 408-5. The signal lines SYNC and DATAn are connected to the transfer unit 1003 via the pad 408-6 and 408-7, respectively. The signal lines EN and WRITEn are connected to the register 1102 via the pad 408-8 and 408-9, respectively. For example, control data indicating a desired emission intensity of the light-emitting elements 602 is stored in the register 1102. A bypass capacitor 302 (described below) is disposed in the vicinity of the light-emitting chip 400. One terminal of the bypass capacitor 302 is connected to the power line, and the other terminal thereof is connected to a ground.

In synchronization with the clock signal from the signal line CLK starting with the line synchronization signal from the signal line SYNC, the transfer unit 1003 receives from the signal line DATAn the input image data including a series of pixel values indicating energization/de-energization of each light-emitting element 602. The transfer unit 1003 performs serial-to-parallel conversion in units of M pixel values (for example, M=4) on a series of pixel values serially received from the signal line DATAn. For example, the transfer unit 1003 includes four D flip-flops connected in cascade. The transfer unit 1003 parallelizes pixel values DATA-1, DATA-2, DATA-3, and DATA-4 input over four clocks and then outputs data to the latch units 1004-0001 to 1004-748. The transfer unit 1003 further includes four D flip-flops for delaying the line synchronization signal. The transfer unit 1003 outputs a first latch signal to the latch unit 1004-001 via a signal line LAT1 at a timing delayed by four clocks since the input of the line synchronization signal.

A k-th latch unit 1004-*k* (k is an integer from 1 to 748) uses a latch circuit to latch the four pixel values DATA-1, DATA-2, DATA-3, and DATA-4 input from the transfer unit 1003 at the same time as the timing when a k-th latch signal is input. The k-th latch unit 1004-*k*, other than the last latch unit 1004-748, delays the k-th latch signal by four clocks and outputs a (k+1)-th latch signal to a latch unit 1004-(*k*+1) via a signal line LAT (k+1). Then, during the signal period of the k-th latch signal, the k-th latch unit 1004-*k* continues outputting driving signals based on the four pixel values latched by the latch circuit to a current drive unit 1104. For example, there is a delay corresponding to four clocks between the timing when the first latch signal is input to a latch unit 1004-1 and the timing when the second latch signal is input to a latch unit 1004-2. The latch unit 1004-1 outputs driving signals based on the first, the second, the third, and the fourth pixel values to the current drive unit 1104 while the latch unit 1004-2 outputs driving signals based on the fifth, the sixth, the seventh, and the eighth pixel values to the current drive unit 1104. Generally speaking, the latch unit 1004-*k* outputs driving signals based on the (4k−3)-th, the (4k−2)-th, the (4k−1)-th, and the (4k)-th pixel values to the current drive unit 1104. According to the exemplary embodiment illustrated in FIG. 10, the 748 latch units 1004-001 to 1004-748 substantially parallelly outputs 2,992 driving signals for controlling the drive of the 2,992 (=748×4) light-emitting elements 602 to the current drive unit 1104. Each driving signal is a binary signal indicating either a high or low level.

The current drive unit 1104 includes 2,992 light-emitting drive circuits corresponding to the 2,992 light-emitting elements 602 each including the partial region of the light-emitting layer 506. While the corresponding driving signal indicates the high level, which is light emission ON, each light-emitting drive circuit applies a drive voltage corresponding to the light emission intensity indicated by the control data in the register 1102 to the light-emitting layer 506 of the corresponding light-emitting element of the light-emitting elements 602. Thus, a current flows across the light-emitting layer 506, causing the corresponding light-emitting element 602 to emit light. The control data may indicate a light emission intensity for each individual light-emitting element 602, a light emission intensity for each group of the light-emitting elements 602, or a light emission intensity common to all of the light-emitting elements 602.

<Multi-Exposure Control>

Figure 11:
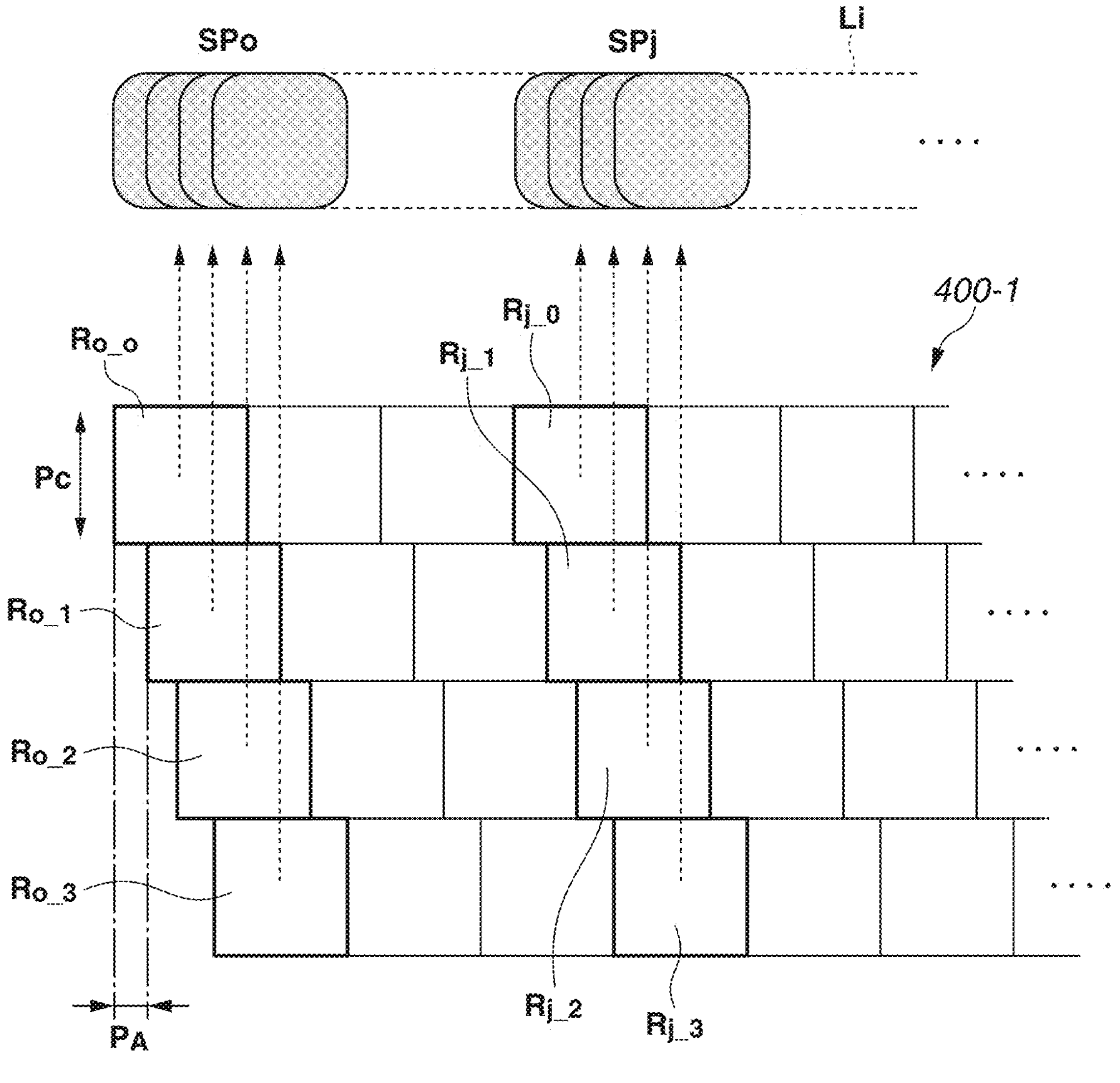
FIG. 11 illustrates multi-exposure by light-emitting elements arranged in a step pattern.

FIG. 4 illustrates an example where the light-emitting elements 602 are arranged in a complete lattice pattern in each light-emitting chip 400. However, according to the present exemplary embodiment, M light-emitting elements 602 in each column can be actually arranged in a step pattern at fixed intervals. FIG. 11 illustrates multi-exposure using light-emitting elements 602 arranged in a step pattern. FIG. 11 partially illustrates an example of an arrangement of the light-emitting elements 602 in the light-emitting chip 400-1 when M=4. $R_{j\_m}$ (j={0, 1, . . . , J−1}, m={0, 1, 2, 3}), in FIG. 11 represents the light-emitting elements 602 in the j-th column from the left in the axial direction and in the m-th row from the top in the circumferential direction. The axial interval Pc between the light-emitting elements 602 may be about 21.16 μm, as described above. The axial interval between two adjacent light-emitting elements 602 out of M light-emitting elements 602 in each column, i.e., an axial interval $P_A$ between the light-emitting elements 602 may be about 5 μm corresponding to a resolution of 4,800 dpi.

When four light-emitting elements 602 in each column are arranged in a step pattern in this way, any two adjacent light-emitting elements 602 out of the four elements 602 occupy a range partially overlapping in the axial direction. When the four light-emitting elements 602 in each row corresponding to different pixel positions in the input image data successively emit light during rotation of the photosensitive drum 102, spots corresponding to the different pixel positions are formed on the surface of the photosensitive drum 102. Referring to the example in FIG. 11, when the leftmost pixel value of the i-th line in the input image data indicates light emission ON, each of light-emitting elements $R_{0\_0}$, $R_{0\_1}$, $R_{0\_2}$, and $R_{0\_3}$ successively emits light at the timing when it faces a line $L_i$ on the surface of the photosensitive drum 102. As a result, the leftmost spot regions in the line $L_i$ are exposed in an overlapped way to form a spot SP0. Likewise, when the j-th pixel value (from the left) of the i-th line in the input image data indicates light emission ON, each of light-emitting elements $R_{j\_0}$, $R_{j\_1}$, $R_{j\_2}$, and $R_{j\_3}$ successively emits light at the timing when it faces the line $L_i$ on the surface of the photosensitive drum 102. As a result, the j-th spot regions (from the left) in the line $L_i$ are exposed in an overlapped way to form a spot $SP_j$.

According to the present exemplary embodiment, as understood from FIG. 11, two axially adjacent light-emitting elements 602 also occupy a range partially overlapping in the axial direction. Likewise, of two axially adjacent light-emitting chips 400, the light-emitting element in the rightmost column of the left-hand side light-emitting chip 400 and the light-emitting element in the leftmost column of the right-hand side emitting chip 400 also occupy a range partially overlapping in the axial direction. The axial interval $P_A$ between the light-emitting elements 602 is constant (about 5 μm) over all of the 20 light-emitting chips 400. When the four light-emitting elements 602 in each column of these light-emitting chips 400 successively emit light at appropriate timings, smooth lines of electrostatic latent images are formed on the surface of the photosensitive drum 102. This line includes a series of spots partially overlapping each other at fixed spot intervals. Such lines continually formed in the circumferential direction result in a two-dimensional electrostatic latent image.

FIGS. 12A to 12D illustrate a procedure of light emission control based on the input image data. In forming an image, the light emission control unit 705 receives input image data IM1 in a binary bitmap format from the image data processing unit 703. Referring to the left-hand side of FIG. 12A, in the input image data IM1 in a two-dimensional pixel value array, the j-th pixel value from the left in the i-th line from the top is referred to as (j, i) (j={0, 1, 2, . . . } and i={1, 2, 3, . . . }). The light emission control unit 705 adds dummy pixel values corresponding to (M−1) lines at the top in the input image data IM1. When M=4, if the dummy pixel values to be added are included, the range of an index i for pixel values is {−3, −2, −1, 0, 1, 2, . . . }. The dummy pixel values may be, for example, zero, which means light emission OFF. The light emission control unit 705 can also add dummy pixel values to the right- and left-hand sides in the input image data IM1 so that the number of pixel values in one line is equal to the number of light-emitting elements 602 in the axial direction. However, in this example, only effective pixel values are described in the axial direction for simple description.

The light emission control unit 705 reads the pixel values of the top four lines in the input image data IM1 during a first line period to of image formation, and outputs a subset of 2,992 (=748×4) read pixel values to the light-emitting chip **400-*n* via the signal line DATAn. Referring to the light-emitting chip 400-1 illustrated on the right-hand side in FIG. 12A, image data in a readout range RD including pixel values (0, −3) to (748, 0) is input via the signal line DATA1 during the line period to. On the light-emitting chip 400-1, the input image data is serial-to-parallel-converted and then driving signals based on these pixel values are supplied to the 2,992 light-emitting elements 602. For example, driving signals based on pixel values (0, −3), (0, −2), (0, −1), (0, 0), and (1, −3) are supplied to the light-emitting elements $R_{0\_0}$, $R_{0\_1}$, $R_{0\_2}$, $R_{0\_3}$ and $R_{1\_0}$, respectively. In particular, as illustrated by broken lines in FIG. 12A, driving signals based on effective pixel values of a line $DL_0$ with the index i=0 in the input image data IM1 are supplied to the light-emitting elements 602 in the fourth row including the light-emitting element $R_{0\_3}$. As a result, a line $L_0$ on the surface of the photosensitive drum 102** is exposed according to a pixel value set of the line $DL_0$ in the input image data IM1. However, this timing is in the middle of multi-exposure, so that the formation of the line $L_0$ of the electrostatic latent image is not completed at this timing.

Figure 12A:
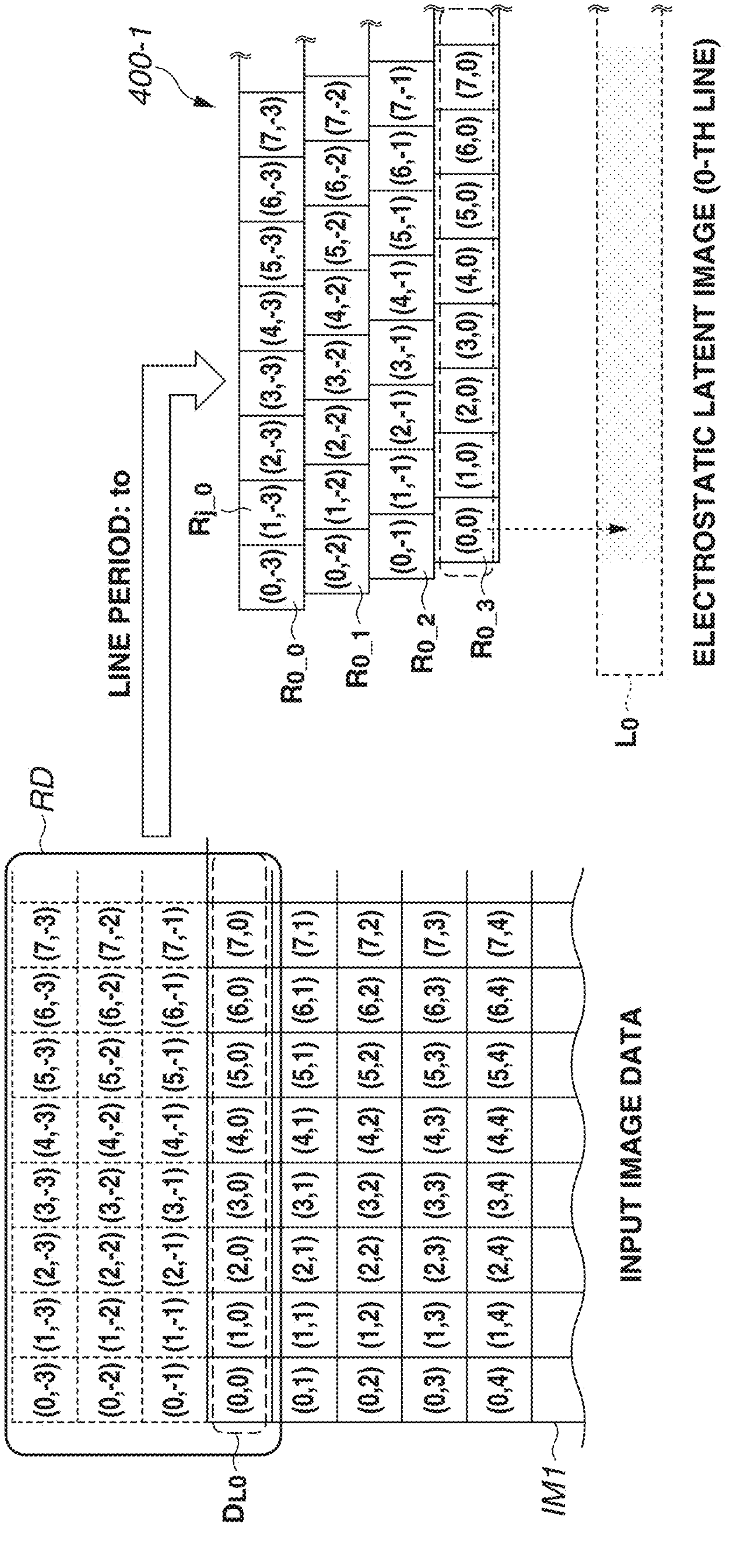
FIG. 12A illustrates a procedure of light emission control based on input image data.
Figure 12B:
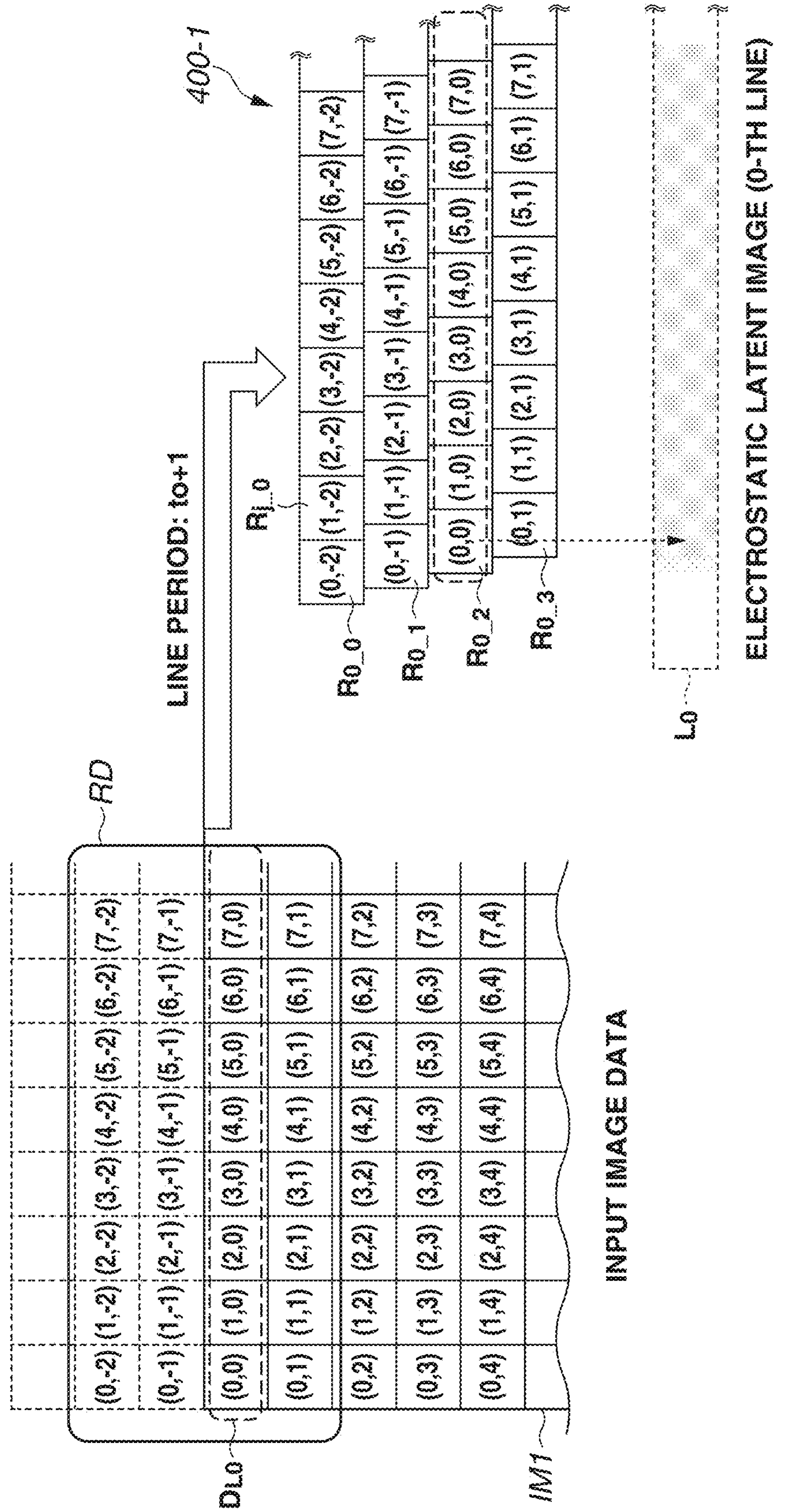
FIG. 12B illustrates the procedure of the light emission control based on the input image data.

FIG. 12B illustrates a state where the light-emitting chip 400-1 is driven during the next line period $t_0$+1. During the line period $t_0$+1, the light emission control unit 705 downwardly moves the readout range RD in the input image data IM1 by one line, reads pixel values (0, −2) to (748, 1), and outputs them to the light-emitting chip 400-1 via the signal line DATA1. On the light-emitting chip 400-1, driving signals based on these input pixel values are supplied to the 2,992 light-emitting elements 602. For example, driving signals based on pixel values (0, −2), (0, −1), (0, 0), (0, 1), and (1, −2) are supplied to the light-emitting elements $R_{0\_0}$, $R_{0\_1}$, $R_{0\_2}$, $R_{0\_3}$, and $R_{1\_0}$, respectively. During the line period $t_0$+1, driving signals based on effective pixel values of the line $DL_0$ in the input image data IM1 are supplied to the light-emitting elements 602 in the third row including the light-emitting element $R_{0\_2}$. At this timing, since the photosensitive drum 102 is rotating in the circumferential direction, the line $L_0$ on the surface of the photosensitive drum 102 faces the light-emitting elements in the third row of the light-emitting chip 400-1. As a result, the line $L_0$ on the surface of the photosensitive drum 102 is exposed again according to a pixel value set of the line $DL_0$ in the input image data IM1.

Figure 12C:
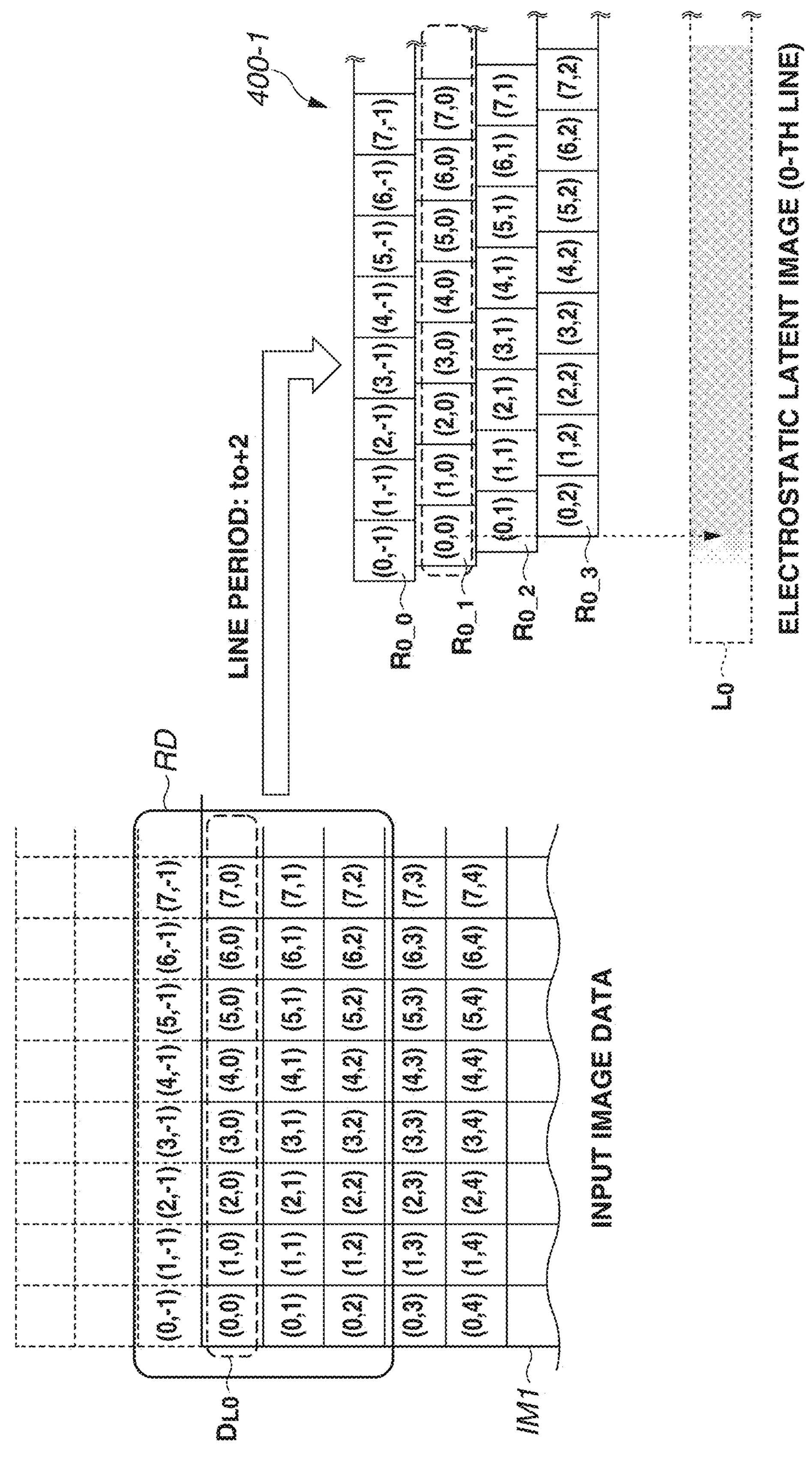
FIG. 12C illustrates still the procedure of the light emission control based on the input image data.

FIG. 12C illustrates a state where the light-emitting chip 400-1 is driven during the next line period $t_0+2$. During the line period $t_0+2$, the light emission control unit 705 further downwardly moves the readout range RD in the input image data IM1 by one line, reads pixel values (0, −1) to (748, 2), and outputs them to the light-emitting chip 400-1 via the signal line DATA1.

The light-emitting chip 400-1 supplies driving signals based on these input pixel values to the 2,992 light-emitting elements 602. During the line period $t_0+2$, driving signals based on effective pixel values of the line $DL_0$ in the input image data IM1 are supplied to the light-emitting elements in the second row including the light-emitting element $R_{0\_1}$. At this timing, the line $L_0$ on the surface of the photosensitive drum 102 faces the light-emitting elements in the second row of the light-emitting chip 400-1. As a result, the line $L_0$ on the surface of the photosensitive drum 102 is exposed three times according to a pixel value set of the line $DL_0$ in the input image data IM1.

Figure 12D:
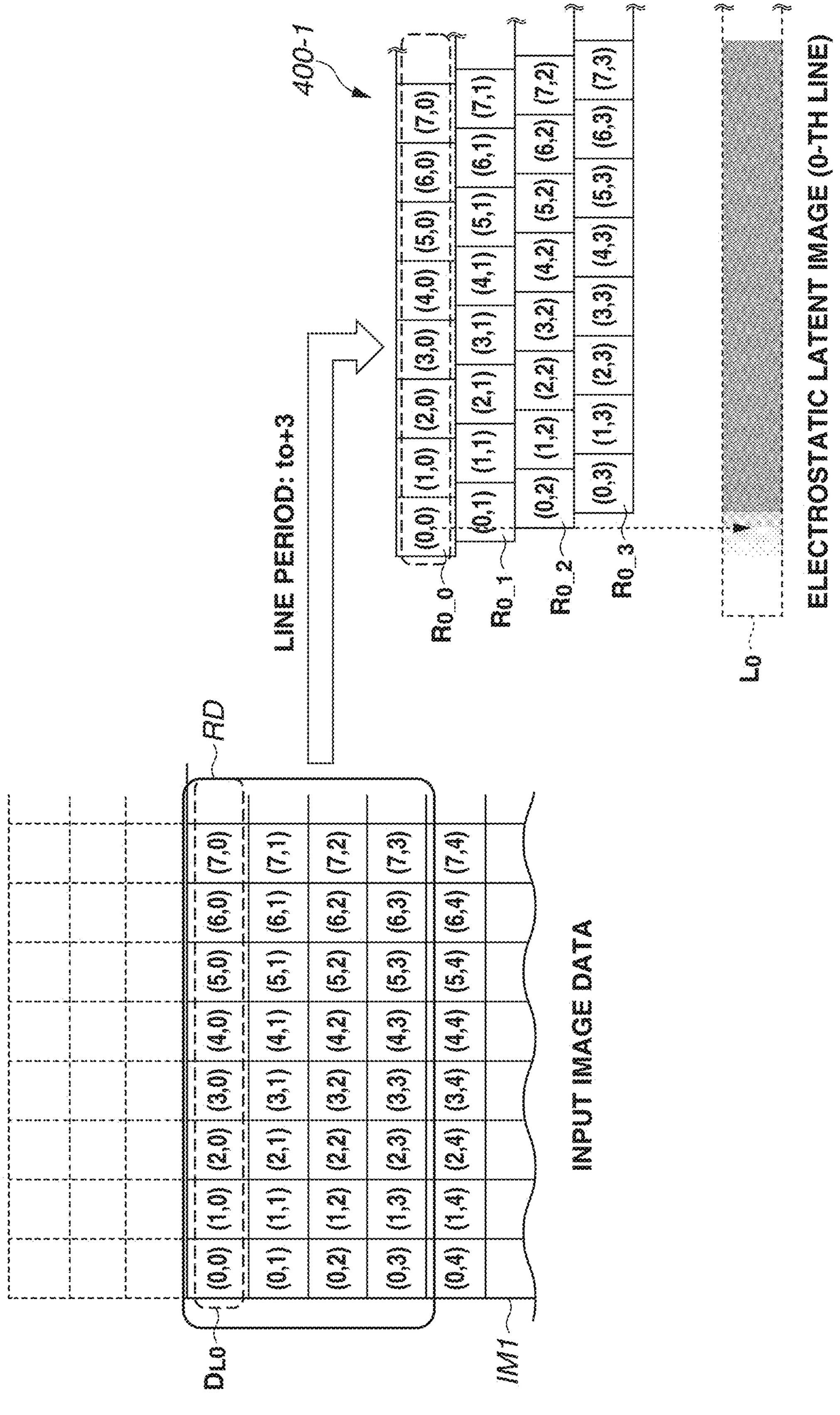
FIG. 12D illustrates still the procedure of the light emission control based on the input image data.

FIG. 12D illustrates a state where the light-emitting chip 400-1 is driven during the next line period $t_0+3$. During the line period $t_0+3$, the light emission control unit 705 further downwardly moves the readout range RD in the input image data IM1 by one line, reads pixel values (0, 0) to (748, 3), and outputs them to the light-emitting chip 400-1 via the signal line DATA1. On the light-emitting chip 400-1, driving signals based on these input pixel values are supplied to the 2,992 light-emitting elements 602. During the line period $t_0+3$, driving signals based on effective pixel values of the line $DL_0$ in the input image data IM1 are supplied to the light-emitting elements in the first row including the light-emitting element $R_{0\_0}$. At this timing, the line $L_0$ on the surface of the photosensitive drum 102 faces the light-emitting elements in the first row of the light-emitting chip 400-1. As a result, the line $L_0$ on the surface of the photosensitive drum 102 is exposed four times according to a pixel value set of the line $DL_0$ in the input image data IM1. Until this timing, multi-exposure by four light-emitting elements 602 in each column of the light-emitting chip 400 has been performed, and the formation of the line $L_0$ of the electrostatic latent image is completed. Lines following the line $L_0$ of the electrostatic latent image can also be formed on the surface of the photosensitive drum 102 in a similar way by repeating the above-described line period. According to the present exemplary embodiment, each of pixel values (0, 0) to (748, 3) is input to the four light-emitting elements 602 in this way. More specifically, for example, the pixel value (0, 0) is input to the four light-emitting elements $R_{0\_0}$, $R_{0\_1}$, $R_{0\_2}$, and $R_{0\_3}$, and the pixel value (1, 0) is input to four light-emitting elements $R_{1\_0}$, $R_{1\_1}$, $R_{1\_2}$, and $R_{1\_3}$. More specifically, the spot on the photosensitive drum 102 corresponding to the pixel value (0, 0) is formed by the four light-emitting elements $R_{0\_0}$, $R_{0\_1}$, $R_{0\_2}$, and $R_{0\_3}$, and the spot on the photosensitive drum 102 corresponding to the pixel value (1, 0) is formed by the four light-emitting elements $R_{1\_0}$, $R_{1\_1}$, $R_{1\_2}$, and $R_{1\_3}$.

As understood from the above description, the light emission control unit 705 produces the light emission of the plurality of the light-emitting elements 602 based on pixel values read from the readout range over M lines in the input image data IM1. The readout range moves by one line for each column period.

<Configuration of Printed Circuit Board>

Figure 13A:
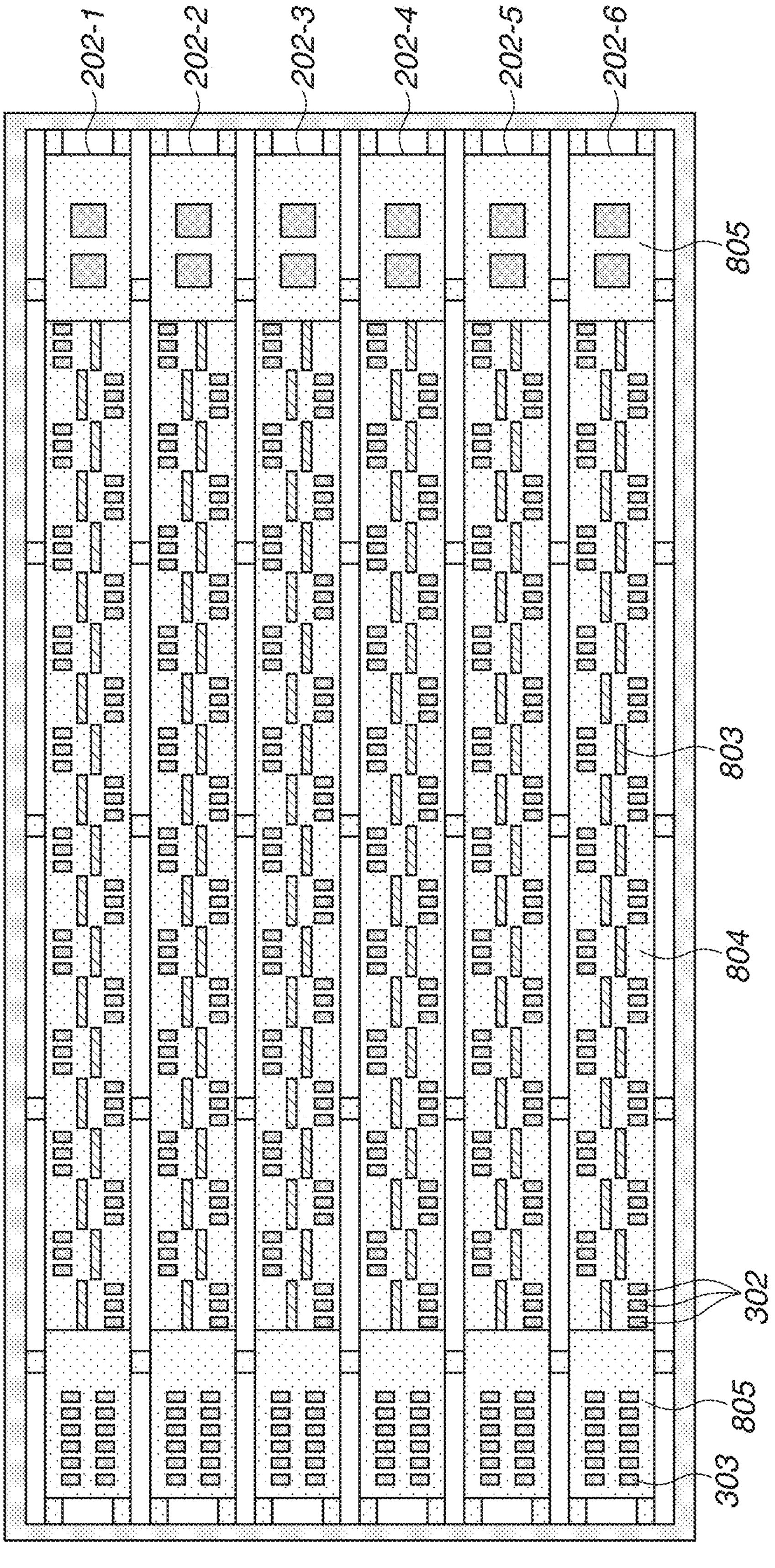
FIG. 13A illustrates a configuration of printed circuit boards before the light-emitting chips according to an exemplary embodiment are mounted.
Figure 13B:
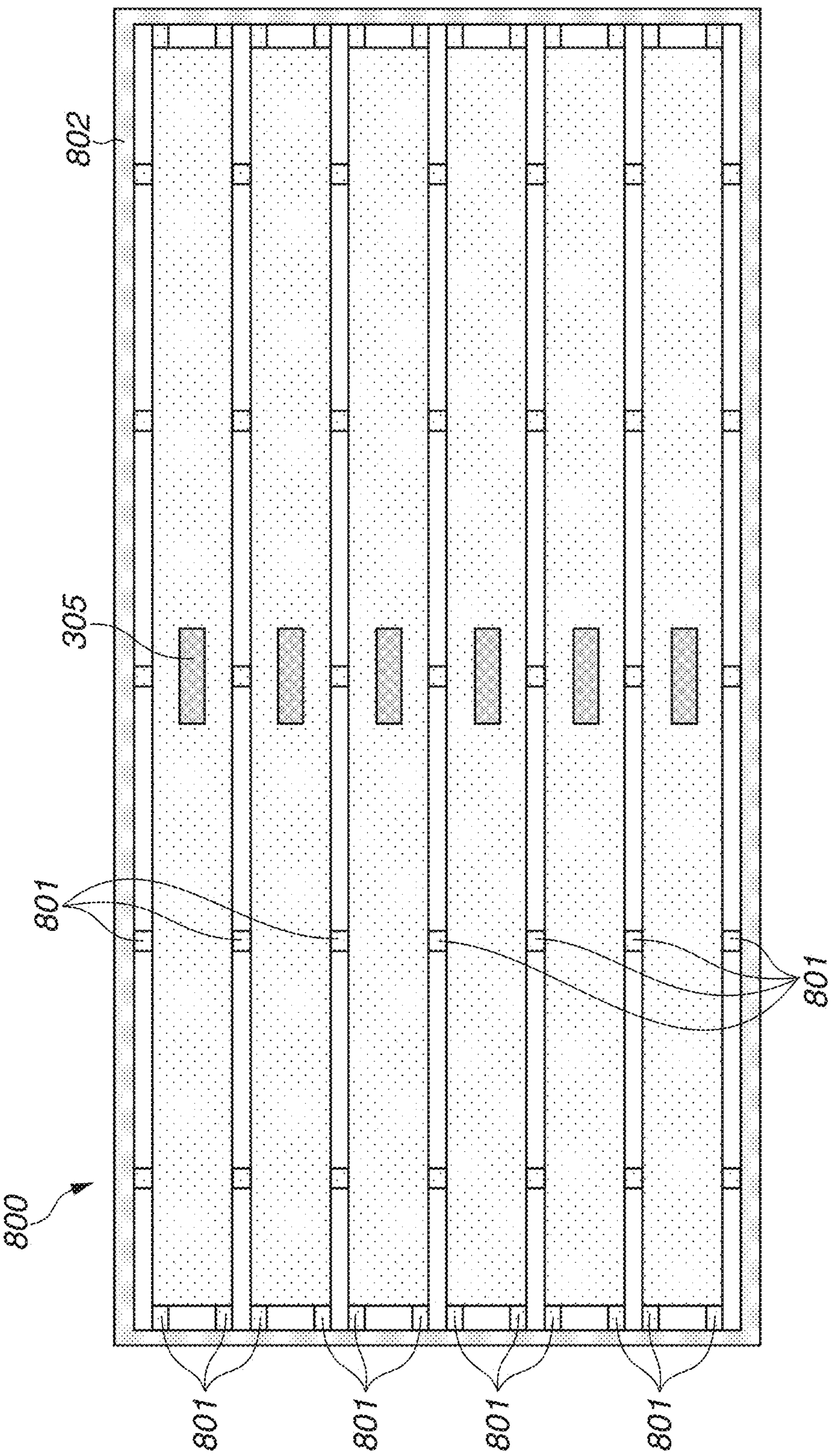
FIG. 13B illustrates the configurations of the printed circuit boards before the light-emitting chips according to an exemplary embodiment are mounted.

A configuration of the printed circuit board 202 before the light-emitting chips 400 are mounted will be described below with reference to FIGS. 13A to 13D. FIGS. 13A and 13B illustrate the printed circuit board 202 before the light-emitting chips 400 are mounted. FIG. 13A illustrates the surfaces of printed circuit boards 202-1 to 202-6 on which the light-emitting chips 400 are mounted. The surface of the printed circuit board 202 on which the light-emitting element array 201 is mounted corresponds to the front surface. FIG. 13B illustrates the opposite surfaces of the surfaces of the printed circuit boards 202-1 to 202-6 on which the light-emitting chips 400 are mounted, i.e., the surfaces on which the connectors 305 are mounted. The opposite surface of the surface of the printed circuit board 202 mounted with the light-emitting chips 400 corresponds to the back surface.

An aggregate 800 includes the printed circuit boards 202-1 to 202-6 before the light-emitting chips 400 are mounted, a plurality of joints 801, and a dummy board 802. While, according to the present exemplary embodiment, the aggregate 800 includes six printed circuit boards 202, the number of printed circuit boards 202 is not limited thereto as long as at least two printed circuit boards 202 are included.

As illustrated in FIG. 13A, the front surfaces of the printed circuit boards 202 are provided with the light-emitting board electrodes 408 disposed on the light-emitting chips 400, printed circuit board electrodes 308 (not illustrated) for electrically connecting the printed circuit boards 202, and electronic components (described below). According to the present exemplary embodiment, electronic components refer to components included in the electronic circuits on the printed circuit boards 202. Examples of electronic components include capacitors, diodes, resistors, and thermistors for measuring the temperature of the light-emitting elements 602. The electronic components are disposed on the same surface as the surface of the printed circuit board 202 on which the light-emitting chips 400 are mounted. One electronic component or a plurality of electronic components may be mounted. Further, one type of electronic component or a plurality of types of electronic components may be disposed.

Examples of electronic components also include the bypass capacitors 302. At least one bypass capacitor 302 is provided for each light-emitting chip 400. One terminal of the bypass capacitor 302 is connected to the power line for supplying power to the light-emitting chips 400, and the other terminal thereof is connected to a ground (GND). The drive unit 1104 included in each light-emitting chip 400 changes in current consumption depending on the driving state. If the current consumption of the drive unit 1104 increases, the power voltage supplied to the drive unit 1104 drops, possibly causing a malfunction of the drive unit 1104. If the current consumption of the drive unit 1104 decreases, the voltage supplied from the power source increases, possibly causing a malfunction of the drive unit 1104. With the bypass capacitor 302 disposed between the power source and the light-emitting chip 400, the electric charge accumulated in the bypass capacitor 302 can be discharged if the voltage supplied from the power source decreases, and an electric charge can be accumulated in the bypass capacitor 302 if the voltage supplied from the power source increases. By reducing variations of the voltage supplied to the light-emitting chip 400 by using the bypass capacitor 302 as described above, variations of the voltage supplied to the light-emitting chip 400 can be reduced.

The impedance of wiring can also cause variations of the voltage supplied to the light-emitting chip 400. Desirably, the wiring length between the bypass capacitor 302 and the light-emitting chip 400 is as short as possible. More specifically, to shorten the wiring length between the bypass capacitor 302 and the light-emitting chip 400, desirably, the bypass capacitor 302 is disposed on the same surface of the printed circuit board 202 as the light-emitting chip 400 and in the vicinity of the light-emitting chip 400. According to the present exemplary embodiment, the bypass capacitor 302 corresponding to each light-emitting chip 400 is disposed at a position where the bypass capacitor 302 overlaps the corresponding light-emitting chip 400 in the longitudinal direction of the board. If the bypass capacitor 302 is disposed at a position where the bypass capacitor 302 overlaps the light-emitting chip 400 in the longitudinal direction of the board, desirably, the distance between the bypass capacitor 302 and the light-emitting chip 400 in the lateral direction of the board 202 is 3 mm or less.

The current supplied from the power source to the light-emitting chip 400 may include a high-frequency noise component due to disturbance. The high-frequency noise component tends to flow through the bypass capacitor 302, so that the noise component flowing in the light-emitting chip 400 can be reduced by discharging the high-frequency noise component to the ground. A noise component often has different frequencies, and the noise component that tends to flow depend on the capacitive reactance of the bypass capacitor 302. Thus, using a plurality of the bypass capacitors 302 having different capacitive reactances enables eliminating noise components having different frequencies. According to the present exemplary embodiment, three different bypass capacitors 302 having different capacitive reactances are disposed on the front surface of the printed circuit board 202. The number of bypass capacitors 302 is merely an example, and not limited thereto. Desirably, the bypass capacitors 302 are disposed in the vicinity of the light-emitting chip 400 as described above. However, the positions of the bypass capacitors 302 are not limited thereto but may be other positions.

<Light Emitting Chip Mounting Process>

Figure 14A:
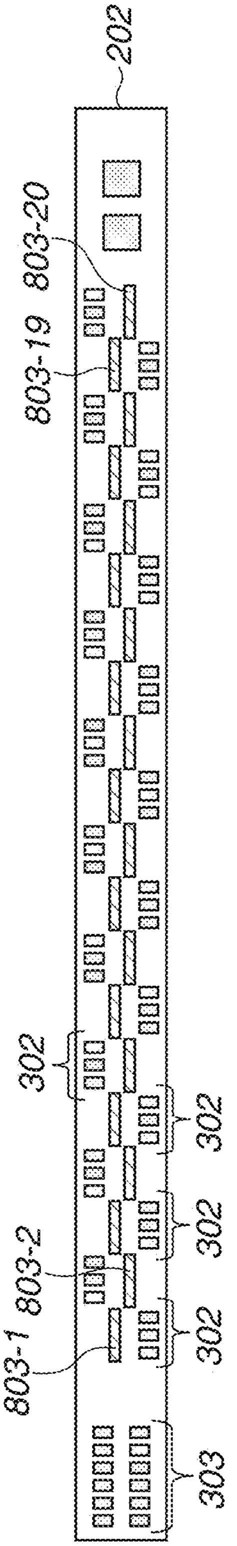
FIGS. 14A to 14C illustrate a light-emitting chip mounting process according to an exemplary embodiment.

A process of mounting the light-emitting chips 400 will be described. FIG. 14A illustrates a printed circuit board 202 before the light-emitting chips 400 are mounted. The light-emitting chips 400 are disposed in light-emitting chip mounting regions 803 on the front surface of the printed circuit board 202. When light-emitting chips 400-1 to 400-20 are mounted on the printed circuit board 202, each of the light-emitting chip mounting regions 803 is disposed in the corresponding light-emitting chip of the light-emitting chips 400, and each light-emitting chip mounting region 803 has 20 light-emitting chip mounting regions 800-1 to 800-20.

Figure 14B:
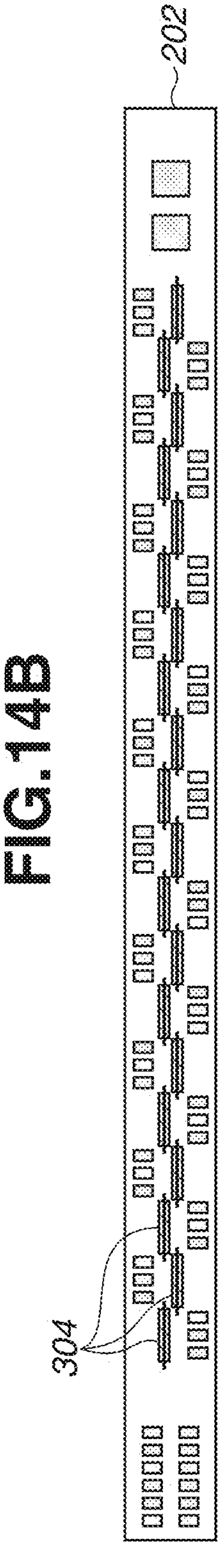

FIG. 14B illustrates a state where an adhesive 304 is applied to each of the light-emitting chip mounting regions 803-1 to 803-20 on the printed circuit board 202. The light-emitting chips 400 are mounted on the printed circuit board 202 by disposing one light-emitting chip 400 in each of the light-emitting chip mounting regions 803 applied with the adhesive 304. While the present exemplary embodiment uses an ultraviolet-curable as the adhesive 304, other adhesives are also applicable. For example, the adhesive 304 may be a heat-curable adhesive or a conductive adhesive. The adhesive 304 may be applied to all or a part of the light-emitting chip mounting regions 803. Further, the adhesive 304 may be applied protruding from the light-emitting chip mounting regions 803.

Figure 14C:
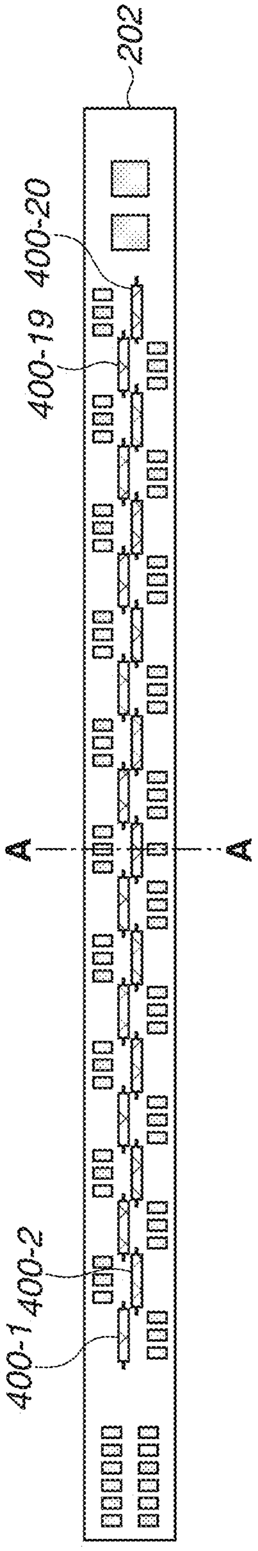

FIG. 14C illustrates the printed circuit board 202 after the light-emitting chips 400 are mounted. The light-emitting chips 400 are mounted and bonded to the light-emitting chip mounting regions 803 applied with the adhesive 304.

After the light-emitting chips 400 have been mounted on the printed circuit board 202, a cleaning process is performed to remove foreign matter on the surfaces of the light-emitting elements 602 on the light-emitting chips 400. Examples of foreign matter on the surfaces of the light-emitting elements 602 include silicon fragments produced during cutting of the light-emitting chips 400 and dust floating in the air. Any of the above-described foreign matter on the surfaces of the light-emitting elements 602 blocks the light emitted by the light-emitting elements 602, possibly decreasing the quantity of light reaching the photosensitive drum 102. Thus, foreign matter on the surfaces of the light-emitting elements 602 is desirably removed.

After completion of the cleaning process for removing foreign matter from the surfaces of the light-emitting elements 602, the printed circuit board electrodes 308 disposed on the printed circuit board 202 are electrically connected to the light-emitting board electrodes 408 disposed on the light-emitting chips 400. While in the present exemplary embodiment, electrical connections are made by using wire bonding (wired electrical connections), other methods are also applicable.

The plurality of the joints 801 (see FIG. 13B) are cut so that each of the plurality of the printed circuit boards 202 forming the aggregate 800 becomes a single printed circuit board 202. While in the present exemplary embodiment, the joints 801 are cut through laser cutting processing, other methods are also applicable. For example, the joints 801 may be cut through mechanical processing.

Through the above-described processes, a single printed circuit board 202 (see FIGS. 3A and 3B) on which the light-emitting chips 400 are mounted can be produced from the aggregate 800 in the initial state.

Then, foreign matter on the plurality of the light-emitting elements 602 of the plurality of the light-emitting chips 400 mounted on each of the printed circuit boards 202 forming the aggregate 800 are removed by using an adhesive cleaning roller 900. Foreign matter on the light-emitting elements 602 includes silicon fragments produced during cutting of the light-emitting chips 400 and dust floating in the general environment. More specifically, a light-emitting element cleaning process is performed with a view to removing foreign matter on the light-emitting elements 602 of the plurality of the light-emitting chips 400 mounted on one surface of each of the printed circuit boards 202 forming the aggregate 800.

<Cleaning Surfaces of Light Emitting Elements>

The light-emitting element cleaning process according to the present exemplary embodiment will be described in detail with reference to FIGS. 15A to 15C. To make it easier to understand height relationships, the light-emitting chips 400, the bypass capacitors 302, and the adhesives 304 in the drawings are larger or smaller than the actual components, and thus, the height ratios therein may be different from the actual ones.

According to the exemplary embodiment, foreign matter on the light-emitting surfaces of the light-emitting elements 602 is removed by bringing the cleaning roller 900 as an adhesive roller into contact with the surfaces of the light-emitting elements 602. The above-described foreign matter may adhere to the surfaces of the light-emitting elements 602 by electrostatic force. In this case, the foreign matter on the surfaces of the light-emitting elements 602 may be unable to be removed by a cleaning method using air blow. Foreign matter on the surfaces of the light-emitting elements 602 are desirably removed by bringing the cleaning roller 900 into contact with the surfaces of the light-emitting elements 602.

Figure 15A:
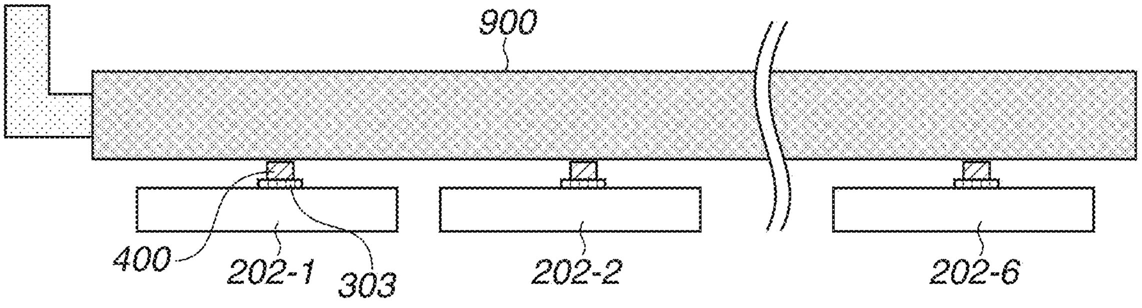
FIGS. 15A to 15C illustrate a light-emitting element cleaning process according to an exemplary embodiment.
Figure 15B:
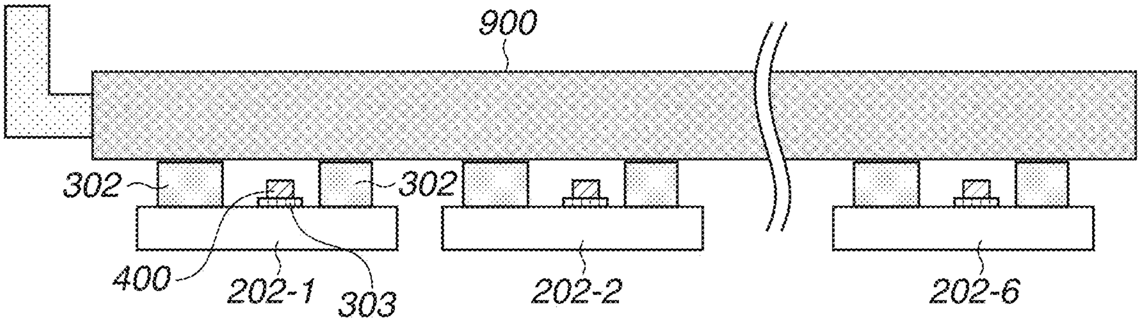
Figure 15C:
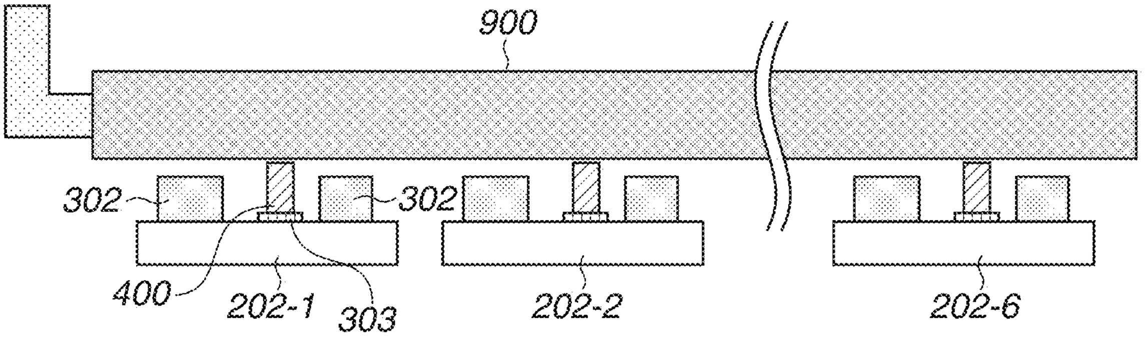

As illustrated in FIGS. 15A to 15C, the cleaning roller 900 is fixed at a predetermined position. The aggregate 800 moves from one end to the other end of each board 202 in the longitudinal direction of the board 202 with the surfaces of the light-emitting elements 602 in contact with the cleaning roller 900. The cleaning roller 900 rotates around the rotational axis perpendicularly intersecting with the longitudinal direction of the boards 202 and parallel to the lateral direction of the boards 202. The cleaning roller 900 removes foreign matter on the surfaces of the light-emitting elements 602 while rotating by frictional force between the surfaces of the light-emitting elements 602 and the cleaning roller 900. The aggregate 800 moves in the longitudinal direction of the boards 202, for example, the direction from the light-emitting chip 400-1 to the light-emitting chip 400-20 or the direction from the light-emitting chip 400-20 to the light-emitting chip 400-1.

While the cleaning method according to the present exemplary embodiment removes foreign matter on the surfaces of the light-emitting elements 602 by moving the aggregate 800 with the cleaning roller 900 fixed, foreign matter may be removed by moving the cleaning roller 900 with the aggregate 800 fixed. Further, foreign matter on the surfaces of the light-emitting elements 602 may be removed by moving both the aggregate 800 and the cleaning roller 900.

While in the present exemplary embodiment, the cleaning roller 900 is used that rotates around the rotational axis perpendicularly intersecting with the longitudinal direction of the boards 202 and parallel to the lateral direction of the boards 202, the direction of the rotational axis is not limited thereto. For example, foreign matter on the surfaces of the light-emitting elements 602 may be removed by using the cleaning roller 900 rotating around the rotational axis perpendicularly intersecting with the lateral direction of the boards 202 and parallel to the longitudinal direction of the boards 202.

While in the present exemplary embodiment, a method is used of using the cleaning roller 900 to remove foreign matter on the light-emitting surfaces of the light-emitting elements 602, other methods are also applicable. More specifically, other applicable methods include a cleaning method for removing foreign matter by bringing an adhesive cleaning member into contact with the surfaces of the light-emitting elements 602 without using the cleaning roller 900.

Further, foreign matter may be removed by using air flow without using an adhesive cleaning member.

In this case, foreign matter may adhere to the light-emitting surfaces of the light-emitting elements 602 by electrostatic force because the foreign matter on the light-emitting surfaces of the light-emitting elements 602 is charged. Thus, foreign matter can be effectively removed by air flow by eliminating charge on the surfaces of the light-emitting elements 602 or on the foreign matter using an ionizer.

FIG. 15A is a cross-sectional view illustrating each board 202 on the front surface of which the light-emitting chip 400 alone is mounted in the longitudinal direction. Referring to FIG. 15A, since the light-emitting chip 400 alone is mounted on the board 202, the cleaning roller 900 can be reliably brought into contact with the light-emitting surfaces of the light-emitting elements 602.

FIG. 15B is a cross-sectional view illustrating each board 202 on the front surface of which the light-emitting chip 400 and the bypass capacitors 302 are mounted in the longitudinal direction. Referring to FIG. 15B, the height of each bypass capacitor 302 from the front surface of the board 202 is higher than the height of the light-emitting chip 400 from the front surface of the board 202 in the vertical direction perpendicular to the front surface of the board 202. According to the present exemplary embodiment, the height of the bypass capacitor 302 is defined as the distance from the front surface of the board 202 to the farthest end of the bypass capacitor 302 in the vertical direction. According to the exemplary embodiment, the height of the light-emitting chip 400 is defined as the distance from the surface of the board 202 facing the cleaning roller 900 to the farthest light-emitting surface of the light-emitting chip 400 in the vertical direction. The light-emitting surface of the light-emitting chip 400 refers to the surface from which light is emitted by the light-emitting elements 602 as light-emitting portions mounted on the light-emitting chip 400.

If the height of the bypass capacitor 302 is higher than the height of the light-emitting chip 400, while the cleaning roller 900 comes into contact with the bypass capacitor 302, the cleaning roller 900 may not come into contact with the light-emitting surfaces of the light-emitting elements 602 included in the light-emitting chip 400. In this case, the cleaning roller 900 is unable to sufficiently remove foreign matter on the light-emitting surfaces of the light-emitting elements 602.

FIG. 15C is a cross-sectional view illustrating each board 202 on the front of which the light-emitting chip 400 and the bypass capacitors 302 are mounted in the longitudinal direction. Referring to FIG. 15C, unlike the board 202 in FIG. 15B, the height of each bypass capacitor 302 from the front surface of the board 202 is lower than the height of the light-emitting chip 400 from the front surface of the board 202. With the height of the bypass capacitor 302 and the height of the light-emitting chip 400 defined as illustrated in FIG. 15C, the cleaning roller 900 can come into contact with the surfaces of the light-emitting elements 602 of the light-emitting chip 400 while the cleaning roller 900 is not disturbed by the bypass capacitor 302, whereby the cleaning roller 900 can sufficiently remove foreign matter on the surfaces of the light-emitting elements 602.

As a configuration for reliably removing foreign matter on the surfaces of the light-emitting elements 602, the height of the bypass capacitor 302 is lower than the height of the light-emitting chip 400 as illustrated in FIG. 15C. However, the cleaning roller 900 can be brought into contact with the surfaces of the light-emitting elements 602 even if the height of the bypass capacitor 302 is the same as the height of the light-emitting chip 400.

The adhesive cleaning roller 900 can be made of an elastic rubber material. Suppose a case where the cleaning roller 900 is made of a rubber material, and the bypass capacitor 302 higher than the light-emitting chip 400 is disposed at a position sufficiently distant from the light-emitting chip 400 in the lateral direction of the board 202. In this case, the cleaning roller 900 can be brought into contact with the light-emitting chip 400 even if the cleaning roller 900 comes into contact with the bypass capacitor 302. In this case, desirably, the bypass capacitor 302 is distant from the light-emitting chip 400 by 3 mm or more in the lateral direction of the board 202, and the difference in height between the bypass capacitor 302 and the light-emitting chip 400 is 0.4 mm or less.

According to the present exemplary embodiment as described above, on the board 202 with the light-emitting chip 400 mounted thereon, the height of the bypass capacitor 302 from the front surface of the board 202 is made lower than the height of the light-emitting chip 400. As described above, the heights of the bypass capacitor 302 and the light-emitting chip 400 set in this way allows foreign matter on the surfaces of the light-emitting elements 602 to be reliably removed.

While in the present exemplary embodiment, the bypass capacitor 302 is used as an example of an electronic component, any member other than the bypass capacitor 302 may be mounted on the board 202. More specifically, a thermistor for measuring the temperature of the light-emitting chip 400 can be disposed on the board 202. Even with a thermistor disposed on the front surface of the board 202, the height of the thermistor from the front surface of the board 202 is desirably lower than the height of the light-emitting chip 400. The height of the thermistor lower than the height of the light-emitting chip 400 allows the cleaning roller 900 to come into contact with the light-emitting chip 400 without being obstructed, making it possible to reliably clean the surface of the light-emitting chip 400.

According to the present disclosure, an exposure head with light-emitting chips and electronic components mounted on the same surface of a board can be provided that allows foreign matter on the light-emitting surfaces of the light-emitting chips to be effectively removed, and an image forming apparatus using the exposure head can be provided.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-097770, filed Jun. 14, 2023, which is hereby incorporated by reference herein in its entirety.

What is claimed is:

1. An exposure head comprising:

at least one light-emitting chip including a plurality of light-emitting portions for emitting light for exposing a photosensitive member from light-emitting surfaces, wherein the at least one light-emitting chip is configured to be supplied with power from a power source via a power line; and a board on one surface of which at least one bypass capacitor connected to the power line and a ground and the at least one light-emitting chip are mounted, wherein, in a vertical direction perpendicular to the one surface of the board, a first height as a height from the one surface of the board to the light-emitting surfaces is higher than a second height as a height from the one surface of the board to an end of the at least one bypass capacitor farthest from the one surface of the board.

2. The exposure head according to claim 1, wherein the at least one light-emitting chip is a plurality of light-emitting chips, wherein the plurality of light-emitting chips is mounted on the one surface of the board, and wherein each of the first heights of the plurality of light-emitting chips is higher than the second height in the vertical direction.

3. The exposure head according to claim 1, wherein at least a part of the at least one bypass capacitor overlaps with the at least one light-emitting chip in a longitudinal direction of the board.

4. The exposure head according to claim 3, wherein the at least one light-emitting chip is a plurality of light-emitting chips, wherein the plurality of light-emitting chips is mounted on the one surface of the board, and wherein each of the plurality of light-emitting chips is disposed in a zigzag pattern in the longitudinal direction.

5. The exposure head according to claim 4, wherein the at least one bypass capacitor is a plurality of bypass capacitors, wherein the plurality of bypass capacitors is mounted on the one surface of the board, and wherein each of the plurality of bypass capacitors is disposed for a corresponding light-emitting chip of the plurality of light-emitting chips.

6. The exposure head according to claim 5, wherein each of the plurality of bypass capacitors is disposed in a zigzag pattern in the longitudinal direction.

7. The exposure head according to claim 1, wherein the exposure head includes a thermistor for measuring a temperature of the at least one light-emitting chip, and wherein the first height is higher than a third height as a height from the one surface of the board to an end of the thermistor farthest from the one surface of the board in the vertical direction.

8. The exposure head according to claim 1, wherein the at least one light-emitting chip is mounted on the board using an adhesive, and wherein the first height is a sum of a height of the adhesive and a height of the at least one light-emitting chip in the vertical direction.

9. The exposure head according to claim 1, wherein a pad electrically connected to the at least one light-emitting chip is disposed on the one surface of the board, and wherein the plurality of light-emitting portions emits light by power supplied via the pad.

10. The exposure head according to claim 9, wherein the pad does not overlap with the at least one light-emitting chip in a longitudinal direction of the board.

11. The exposure head according to claim 1, wherein a difference between the first and the second heights is smaller than 0.4 millimeters (mm).

12. The exposure head according to claim 1, wherein each of the plurality of light-emitting portions is an organic electroluminescence (EL) device.

13. An image forming apparatus comprising:

the exposure head according to claim 1; and a photosensitive member.

14. The image forming apparatus according to claim 13, wherein each of the plurality of light-emitting portions is an organic electroluminescence (EL) device.

* * * * *